(12) United States Patent
Tsukamoto et al.

(10) Patent No.: US 8,435,669 B2
(45) Date of Patent: May 7, 2013

(54) ELECTRO-CHEMICAL DEVICE AND METHOD FOR MANUFACTURING THE SAME

(75) Inventors: Naoto Tsukamoto, Tokyo (JP); Hidetake Itoh, Tokyo (JP); Yoshihiko Ohashi, Tokyo (JP)

(73) Assignee: TDK Corporation, Tokyo (JP)

( * ) Notice: Subject to any disclaimer, the term of this patent is extended or adjusted under 35 U.S.C. 154(b) by 234 days.

(21) Appl. No.: 12/897,251

(22) Filed: Oct. 4, 2010

(65) Prior Publication Data

US 2011/0086264 A1    Apr. 14, 2011

(30) Foreign Application Priority Data

Oct. 8, 2009 (JP) ................. P2009-234485
Oct. 16, 2009 (JP) ................. P2009-239373
Oct. 16, 2009 (JP) ................. P2009-239739
Oct. 16, 2009 (JP) ................. P2009-239740

(51) Int. Cl.
    *H01M 6/46* (2006.01)
(52) U.S. Cl.
    USPC ........................................ 429/162

(58) Field of Classification Search .................. None
See application file for complete search history.

(56) References Cited

U.S. PATENT DOCUMENTS 7,972,722 B2    7/2011    Yamada

FOREIGN PATENT DOCUMENTS

| JP | A-1-243567 | 9/1989 |
|---|---|---|
| JP | A-2000-285904 | 10/2000 |
| JP | A-2002-56839 | 2/2002 |
| JP | A-2003-86152 | 3/2003 |
| JP | A-2003-86153 | 3/2003 |
| JP | A-2004-362935 | 12/2004 |
| JP | A-2006-164752 | 6/2006 |
| JP | A-2008-192451 | 8/2008 |
| JP | A-2009-087751 | 4/2009 |

*Primary Examiner* — Cynthia Walls
(74) *Attorney, Agent, or Firm* — Oliff & Berridge, PLC

(57) ABSTRACT

An electro-chemical device comprises a package including a metal film, a battery element sealed within the package, resin layers disposed at least on the inside of a seal part of the package, and a lead extending from the battery element to the outside of the package through between the resin layers at the seal part of the package. The lead has a special form into which the resin of the resin layers bites, so that the lead is firmly buried in the resin layers, whereby the lead is fully inhibited from moving. Therefore, an electro-chemical device having a high quality can be obtained.

3 Claims, 25 Drawing Sheets

Fig.2
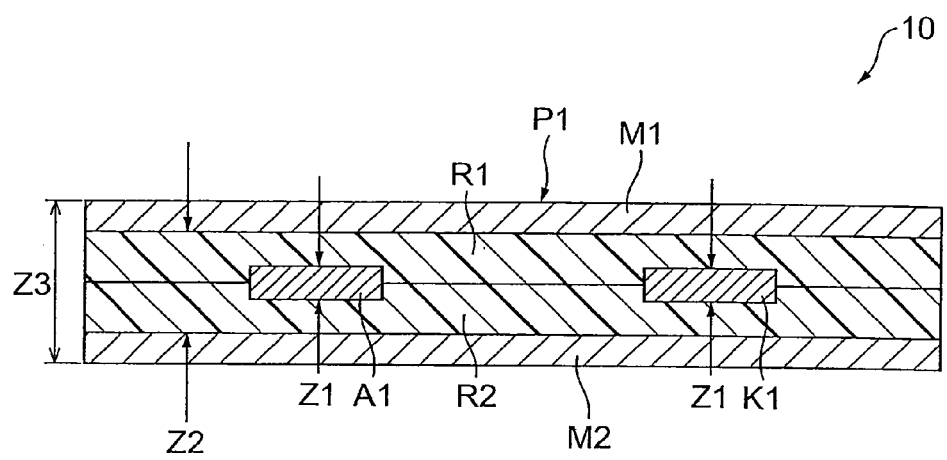
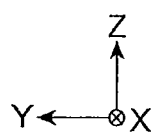

Fig.5
(A)
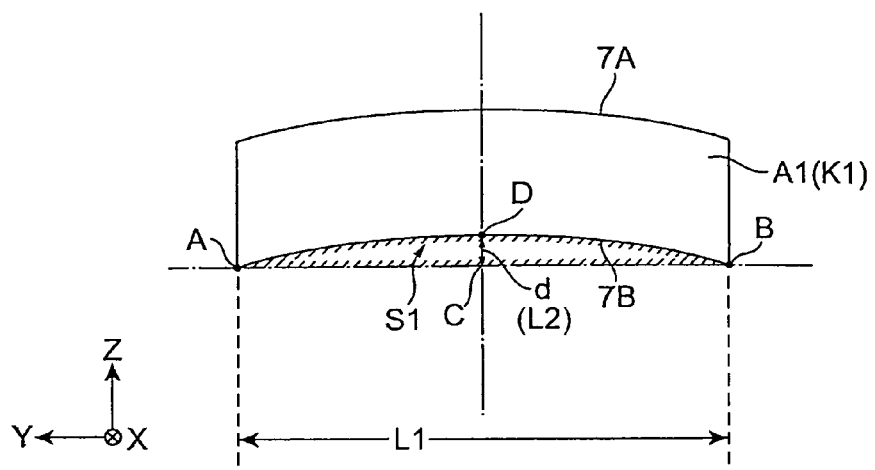
(B)
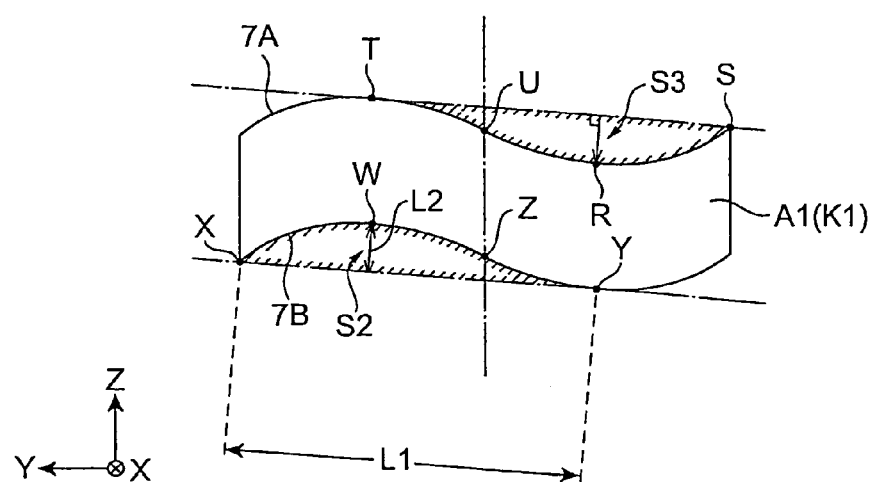

Fig.9
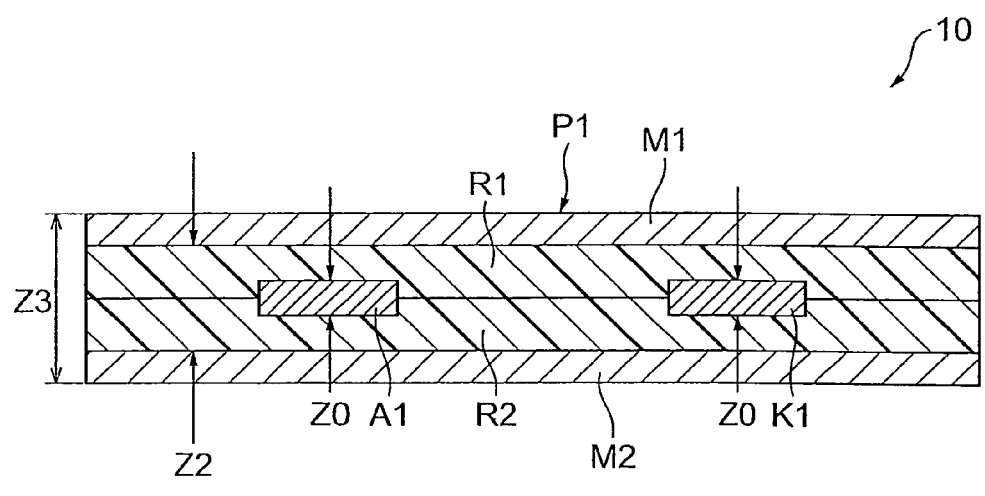
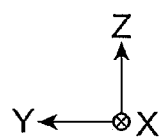

Fig.23
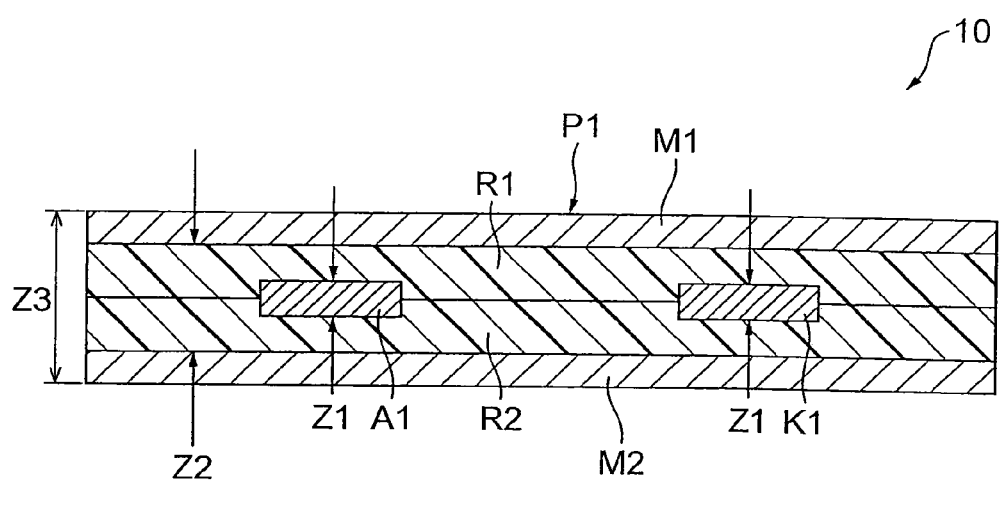
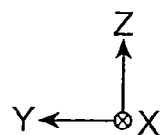

ELECTRO-CHEMICAL DEVICE AND METHOD FOR MANUFACTURING THE SAME

BACKGROUND OF THE INVENTION

1. Field of the Invention

The present invention relates to an electro-chemical device and a method for manufacturing the same.

2. Related Background Art

Conventional electro-chemical devices have been made by sealing a battery element such as a lithium-ion secondary battery (LIE) or electric double-layer capacitor (EDLC) into a package made of aluminum. That is, a battery element is arranged within a package made of an aluminum laminate, an electrolytic solution is introduced into the package when necessary, and peripheries of the package are sealed.

Anode and cathode leads extend from the battery element through a gap in a seal part of the package to the outside. Resin layers are disposed on the inside of the aluminum laminate and allow sealing when the seal part is subjected to thermocompression bonding. Some studies have been conducted concerning the structure between the seal part and the leads. Patent Literature 1 (Japanese Patent Application Laid-Open No. 2003-86153) provides the lead with a plurality of holes in the seal part, thereby increasing the bonding area in this part. Patent Literature 2 (Japanese Patent Application Laid-Open No. 2003-86152) narrows the width of the lead in the seal part, thereby increasing the bonding area in this part.

SUMMARY OF THE INVENTION

However, the inventors have found a problem that the conventional techniques fail to yield electro-chemical devices with high qualities.

That is, the inventors have noticed that, since the lead itself is formed by cutting a metal film with a blade coming into contact therewith, its widthwise end portions slightly curve in a curling fashion at the time of cutting. There are also cases where burrs occur in the widthwise end portions of the lead at the time of cutting, the curve and burrs damage the resin layers on the inside of the package and reach the metal film, thereby forming short circuits and leakage paths, and the space within the curved surface is not filled with the resin layers at the time of thermocompression bonding. The inventors have found the problem that, because of the foregoing, liquids and gases leak from the inside, the leads short-circuit, and so forth as time passes, thereby yielding defective products in many cases, whereby electro-chemical devices with high qualities may not be obtained.

Therefore, the present invention provides an electrochemical device comprising a package including a metal film, a battery element sealed within the package, resin layers disposed at least on the inside of a seal part of the package, and a lead extending from the battery element to the outside of the package through between the resin layers at the seal part of the package; wherein the length L1 of a line segment connecting one end of an arc in one direction of a curved surface of the lead and a point extending from the one end and coming into contact with the lead, the maximum value L2 of the shortest distance from the line segment to the curved surface of the lead, the thickness Z1 of the lead, the total thickness Z2 of the resin layers, and the curvature ratio R of the lead satisfy the relationship of $30\% \leq 1/Z2 \leq 60\%$, $R=L2/L1$, and $0<R \leq 2\%$.

This inhibits the end part of the lead from sharpening and makes it less likely to damage the resin layers falling within a specific thickness range and metal films thereon and thereunder, whereby the hermetic property of the sealed package improves. Though the present invention is totally different from the prior art, 0% is omitted from the curvature ratio R in order to clarify the difference from the theoretical prior art, while the curvature of the lead cut with a blade cannot completely be eliminated.

Preferably, the thickness Z1 of the lead satisfies the relationship of $30 \, \mu m \leq Z1 \leq 200 \, \mu m$.

This is effective in having a strength which can endure thermocompression bonding.

Preferably, within a cross section of the lead perpendicular to a longitudinal direction thereof, the area S surrounded by the curved surface and the line segment satisfies the relationship of $0<S \leq 0.02 \, mm^2$.

This is effective in making it easier for the region defining the area S to be filled with the resin layers, thereby improving the hermetic property of the package. It has been observed in the prior art that this space is filled with a gas, so that the gas or electrolytic solution leaks from the seal part when the device is heated or the inner pressure is raised by an electrolysis of the electrolytic solution. Such disadvantages are remarkably ameliorated by the present invention.

The present invention provides a method for manufacturing the electro-chemical device comprising the steps of pressing at least a region located at the seal part of the lead so as to improve the flatness of the lead, and arranging the lead with the improved flatness between the resin layers at the seal part and thermocompression-bonding them together with the package.

In this case, while the resin layers are softened at the time of thermocompression bonding so as to surround the lead closely, the lead has been flattened beforehand by pressing, so as to enhance the adhesion to the resin layers, whereby an electro-chemical device having a high quality is manufactured.

Preferably, in the method for manufacturing an electro-chemical device in accordance with the present invention, the pressure $P_P$ at the time of pressing and the pressure $P_T$ at the time of thermocompression bonding satisfy the relationship of $P_P > P_T$. Pressing under a pressure higher than that of typical thermocompression bonding is effective in improving the flatness of the lead.

Preferably, in the method for manufacturing an electro-chemical device in accordance with the present invention, the pressure $P_P$ at the time of pressing and the pressure $P_T$ at the time of thermocompression bonding satisfy the relationship of $2.0 \, kgf/cm^2$ $(1.96 \times 10^5 \, Pa) \leq P_P \leq 6.0 \, kgf/cm^2$ $(5.88 \times 10^5 \, Pa)$ and $1.0 \, kgf/cm^2$ $(0.98 \times 10^5 \, Pa) \leq P_T \leq 4.0 \, kgf/cm^2$ $(3.92 \times 10^5 \, Pa)$. This is effective in enabling thermocompression bonding while keeping the lead form unchanged from the time of pressing.

The inventors have also found a problem that the conventional techniques fail to attain electro-chemical devices with high qualities, since internal liquids and gases may leak or leads short-circuit as time passes, thereby yielding defective products.

An electro-chemical device dealing with this problem comprises a battery element sealed within a package, resin layers disposed at least on the inside of a seal part of the package, and a plurality of leads extending from the battery element to the outside of the package through between the resin layers at the seal part of the package; wherein each of the leads has a plurality of cutouts separated from each other along a longitudinal direction of the lead at the seal part.

In this case, there are a plurality of cutouts separated from each other in the longitudinal direction, while the resin of the resin layers bites into the cutouts, whereby the leads are firmly buried in the resin layers and fully inhibited from moving in the longitudinal direction. The movement of leads is unfavorable, since it may cause internal liquids to leak out. Even when the leads are drawn out slightly, minute voids may occur there, through which the electrolytic solution may leak out or the moisture in the atmosphere may be taken in, thus shortening the life of the device. Hence, inhibiting the leads from moving can suppress these disadvantages and provide an electro-chemical device having a high quality.

The plurality of cutouts may be disposed on both sides in a width direction of the lead, respectively, so that no cutout is located on an extension of one cutout in the width direction of the lead. That is, the cutouts are arranged in a staggered manner along the longitudinal direction of the lead.

A method for manufacturing this electro-chemical device comprises the steps of cutting off at least a plurality of regions located at the seal part of the lead so as to form the cutouts, and arranging the lead having the cutouts between the resin layers at the seal part and thermocompression-bonding them together with the package. This can manufacture leads inhibited from moving longitudinally and breaking, whereby an electro-chemical device having a high quality can be provided.

The present invention provides another electro-chemical device comprising a battery element sealed within a package, resin layers disposed at least on the inside of a seal part of the package, and a plurality of leads extending from the battery element to the outside of the package through between the resin layers at the seal part of the package; wherein each of the leads has a plurality of thinned parts partly thinned by pressing in a thickness direction thereof at the seal part.

In this case, the plurality of thinned parts can form a difference in level between an unprocessed region and a processed region (thinned part), while the resin layers bite into this difference in level, whereby the leads are fully inhibited from moving in the longitudinal direction.

A method for manufacturing this electro-chemical device comprises the steps of pressing at least a plurality of regions located at the seal part of the leads so as to form the thinned parts, and arranging the lead having the thinned parts between the resin layers at the seal part and thermocompression-bonding them together with the package. The thinned parts exhibit a strength, higher than that of the cutouts formed by punching and are harder to break. This can manufacture leads inhibited from moving longitudinally and breaking, whereby an electro-chemical device having a high quality can be provided.

The present invention provides still another electro-chemical device comprising a battery element sealed within a package, resin layers disposed at least on the inside of a seal part of the package, and a plurality of leads extending from the battery element to the outside of the package through between the resin layers at the seal part of the package; wherein each of the leads has a band-like thinned part thinned by pressing the lead transversely along a width direction thereof at the seal part and a cutout provided with the thinned part.

The thinned part is depressed to the inside in the thickness direction of the lead, while its portion provided with the cutout is depressed to the inside in the width direction of the lead, so that the lead has an inwardly depressed form throughout a periphery about the longitudinal direction of the lead. The resin biting into these depressions remarkably inhibits the lead from moving in the longitudinal direction.

A method for manufacturing this electro-chemical device comprises the steps of pressing at least a plurality of regions located at the seal part of the lead so as to form the thinned part, cutting off a partial region from the thinned part so as to form the cutout, and arranging the lead having the thinned part and cutout between the resin layers at the seal part and thermocompression-bonding them together with the package. This can manufacture leads inhibited from moving longitudinally and breaking, whereby an electro-chemical device having a high quality can be provided.

In order to deal with the problem that electro-chemical devices having high qualities cannot be obtained because of defective products caused by internal liquids and gases leaking out and leads short-circuiting as time passes as mentioned above, the present invention provides an electro-chemical device comprising a battery element sealed within a package, resin layers disposed at least on the inside of a seal part of the package, and a plurality of leads extending from the battery element to the outside of the package through between the resin layers at the seal part of the package; wherein each of the leads has a cutout located at the seal part; and wherein the cutout on each of side faces in a width direction of the lead has an opening size in a longitudinal direction of the lead smaller than that of the cutout in the longitudinal direction of the lead at a position inside of the side faces in the width direction of the lead.

In this case, the resin of the resin layers bites into the cutout, so that the lead is firmly buried in the resin layers, while the opening size at the side faces is smaller than that on the inside, whereby the resin inside the cutout is less likely to flow out. That is, the relative relationship between the cutout and the resin layers is secured more firmly. This fully inhibits the lead from moving in the longitudinal direction. The form of the cutout in the present invention is also such that the inner surface of the opening restrains the lead from moving in the width direction thereof relative to the resin. The movement of leads is unfavorable, since it may cause internal liquids to leak out. Even when the leads are drawn out slightly, minute voids may occur there, through which the electrolytic solution may leak out or the moisture in the atmosphere may be taken in, thus shortening the life of the device. Also, the leads may easily be pulled out during the processing such as soldering of the leads. Hence, inhibiting the leads from moving can suppress these disadvantages and provide an electro-chemical device having a high quality.

A method for manufacturing the electro-chemical device in accordance with the present invention comprises the steps of cutting off at least a region located at the seal part of the lead so as to form the cutout, and arranging the lead having the cutout between the resin layers at the seal part and thermocompression-bonding them together with the package. This can manufacture a lead inhibited from moving longitudinally and breaking, whereby an electro-chemical device having a high quality can be provided.

The present invention provides still another electro-chemical device comprising a battery element sealed within a package, resin layers disposed at least on the inside of a seal part of the package, and a plurality of leads extending from the battery element to the outside of the package through between the resin layers at the seal part of the package; wherein each of the leads has a groove on a main surface thereof at the seal part, the groove extending in a direction tilted with respect to a width direction of the lead.

In this case, the resin of the resin layers bites into the groove, so that the lead is firmly buried in the resin layers, while the groove extends obliquely, whereby gases existing in the groove, if any, are easier to let out of the package at the time of sealing and the like. This makes it harder for the gases to be trapped by the resin layers at the seal part, whereby the bonding force of the seal part can be inhibited from being lowered by such a phenomenon.

In this case, the groove extends obliquely, so that the resin layers bite into the side faces of the groove, i.e., the difference in level, whereby the leads are restrained from moving in both the longitudinal and width directions thereof relative to the resin layers. The movement of leads is unfavorable, since it may cause internal liquids to leak out. Even when the leads are drawn out slightly, minute voids may occur there, through which the electrolytic solution may leak out or the moisture in the atmosphere may be taken in, thus shortening the life of the device. Also, the leads may easily be pulled out during the processing such as soldering of the leads. Hence, inhibiting the leads from moving can suppress these disadvantages and provide an electro-chemical device having a high quality.

A method for manufacturing this electro-chemical device comprises the steps of obliquely pressing at least a region of the lead located at the seal part with respect to a width direction of the lead so as to form the groove, and arranging the lead having the groove between the resin layers at the seal part and thermocompression-bonding them together with the package.

This can manufacture a lead inhibited from moving, whereby an electro-chemical device having a high quality can be provided.

BRIEF DESCRIPTION OF THE DRAWINGS

FIG. 2 is a sectional view of the electro-chemical device taken along the line II-II of FIG. 1;

FIG. 5 is a longitudinal sectional view of a unidirectionally curved lead (A) and a longitudinal sectional view of a lead curved like letter S (B);

FIG. 9 is a sectional view of the electro-chemical device taken along the line IX-IX of FIG. 8;

FIG. 23 is a sectional view of the electro-chemical device taken along the line XXIII-XXIII of FIG. 22;

DESCRIPTION OF THE PREFERRED EMBODIMENTS

In the following, electro-chemical devices in accordance with embodiments will be explained.

The electro-chemical devices illustrated in FIGS. 1 to 7 will be referred to as A type. The electro-chemical devices illustrated in FIGS. 8 to 17 will be referred to as B type. The electro-chemical device illustrated in FIGS. 18 to 21 will be referred to as C type. The electro-chemical device illustrated in FIGS. 22 to 25 will be referred to as D type. In the explanation of the electro-chemical devices of these types, the same constituents will be referred to with the same symbols, while omitting their overlapping descriptions.

First, the A-type electro-chemical devices will be explained.

Figure 1:
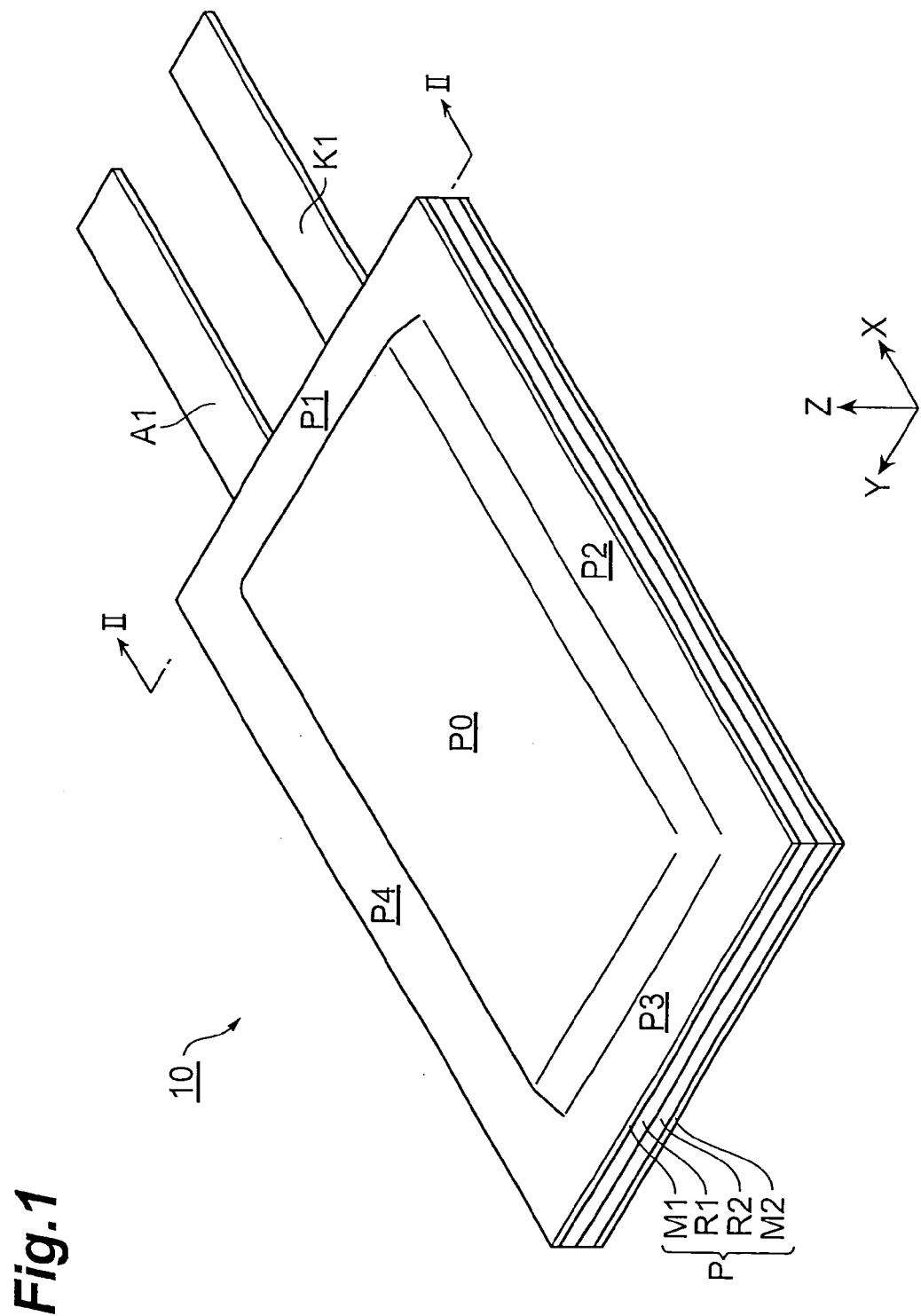
FIG. 1 is a perspective view of an electro-chemical device.
Figure 3:
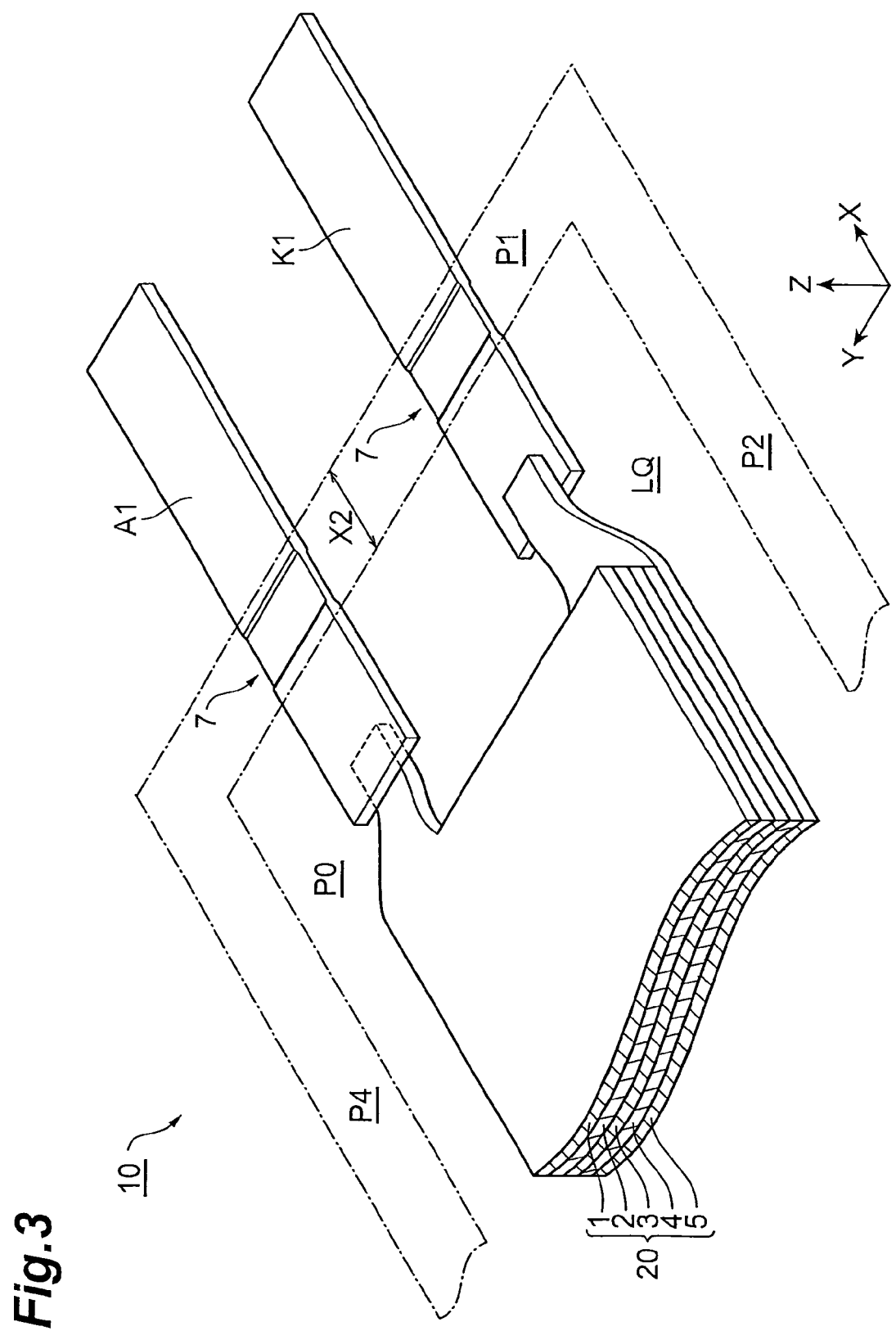
FIG. 3 is an enlarged perspective view of a seal part of the electro-chemical device and its vicinity.

FIG. 1 is a perspective view of an A-type electro-chemical device. FIG. 2 is a sectional view of the electro-chemical device taken along the line II-II of FIG. 1. FIG. 3 is an enlarged perspective view of a seal part of the electro-chemical device and its vicinity. In these drawings, an XYZ three-dimensional orthogonal coordinate system is set as illustrated.

This electro-chemical device is an electric double-layer capacitor (EDLC) comprising a package P including metal films M1, M2, a battery element 20 (see FIG. 2) sealed within the package P, resin layers R1, R2 disposed at least on the inside of a seal part (top seal part) P1 of the package P, and leads A1, K1 extending from the battery element 20 to the outside of the package P through between the resin layers R1, R2 at the seal part P1 of the package P. The leads A1, K1 extend along the X axis, while their width and thickness directions coincide with the Y and Z axes, respectively.

The resin layers R1, R2 are attached to the whole inner faces of the metal thins M1, M2, respectively, but may be disposed at only the seal parts P1, P2, P3, P4 in peripheries of the four sides of the rectangular package P on the metal films M1, M2. The seal parts P1, P2, P3, P4 are sealed by thermocompression bonding. The battery element 20 is arranged within a center region P0 surrounded by the seal parts P1, P2, P3, P4 at the four sides of the package P. A voltage can be applied between the lead A1 acting as an anode and the lead K1 acting as a cathode, so as to charge the battery element 20, and the power charged in the battery element 20 can be taken out from the leads.

Referring to FIG. 2, let Z1, Z2, and Z3 be the thickness of the lead A1 (K1) at the seal part P1, total thickness of the resin layers R1, R2, and total thickness of the package, respectively. Preferably, in is case, the thickness of the lead A1 (K1) and the total thickness Z2 of the resin layers R1 R2 satisfy the relationship of $30\% \leq Z1/Z2 \leq 60\%$.

Numerous structures can be considered for the battery element 20 illustrated in FIG. 3. As an electrode on the anode (positive electrode) side, one combining a current collector 1 made of a foil of a metal such as copper and a polarizable electrode 2 made of an activated carbonaceous structure together is used in this example. As an electrode on the cathode (negative electrode) side, one combining a current collector 5 made of a foil of a metal such as aluminum and a polarizable electrode 4 made of an activated carbonaceous structure together is used in this example. A separator 3 is disposed between the positive and negative electrodes. While a plurality of battery elements may be laminated as a matter of course, an example accommodating only one battery element is illustrated here for simplicity.

Each of the polarizable electrodes 2, 4 is made of a porous material, which is manufactured by mixing a binder resin with activated carbon. Examples of the binder resin include fluorine-containing polymer compounds such as polytetrafluoroethylene and rubber-based polymer compounds such as styrene butadiene rubber. Fine particles or fine fibers of carbon black, carbon nanotube, or graphite may be compounded as a conductive auxiliary when necessary.

As the current collectors 1, 5, those in which surfaces of copper and aluminum foils are roughened by etching may be used. There are numerous methods for manufacturing an electrode, such as one adding a conductive auxiliary and a binder to activated carbon and then bonding thus formed sheet to the current collector, and one turning activated carbon into a slurry and then applying it to the current collector.

The separator 3 is made of a nonwoven or porous film containing a polyolefin-based resin by a weight ratio of 10% or more, for example. The polarizable electrodes and the separator may be bonded together by applying a pressure to a pair of polarizable electrodes in an environment with a temperature at a softening point of the polyolefin-based resin or higher. Nonwovens made of celluloses and aramid fibers may also be used as the separator.

Known as examples of an electrolytic solution LQ filling the package P are aqueous and organic ones. For organic electrolytic solutions, examples of solvents include propylene carbonate and acetonitrile, while ammonium salts, amine salts, and amidine salts are known as solutes.

As illustrated in FIG. 3, the current collectors 1, 5 of the positive and negative electrodes are joined to the leads A1, K1, respectively. They may be made of integrated metal foils as well. Each of the leads A1, K1 is provided with a flattening-processed region 7 formed by pressing. The thickness of this part is as mentioned above and made thinner than that of unprocessed regions on the outer sides, so as to form differences in level at boundaries between the flattening-processed region 7 and the unprocessed regions. The leads A1, K1 are inserted into a press machine having two flat pressing surfaces opposing each other and flattened by pressing, so as to form the flattening-processed regions 7. A conventional thermocompression bonding press machine may be used for flattening, since the seal part P1 and the like are also subjected to thermocompression bonding by the press machine.

Figure 4:
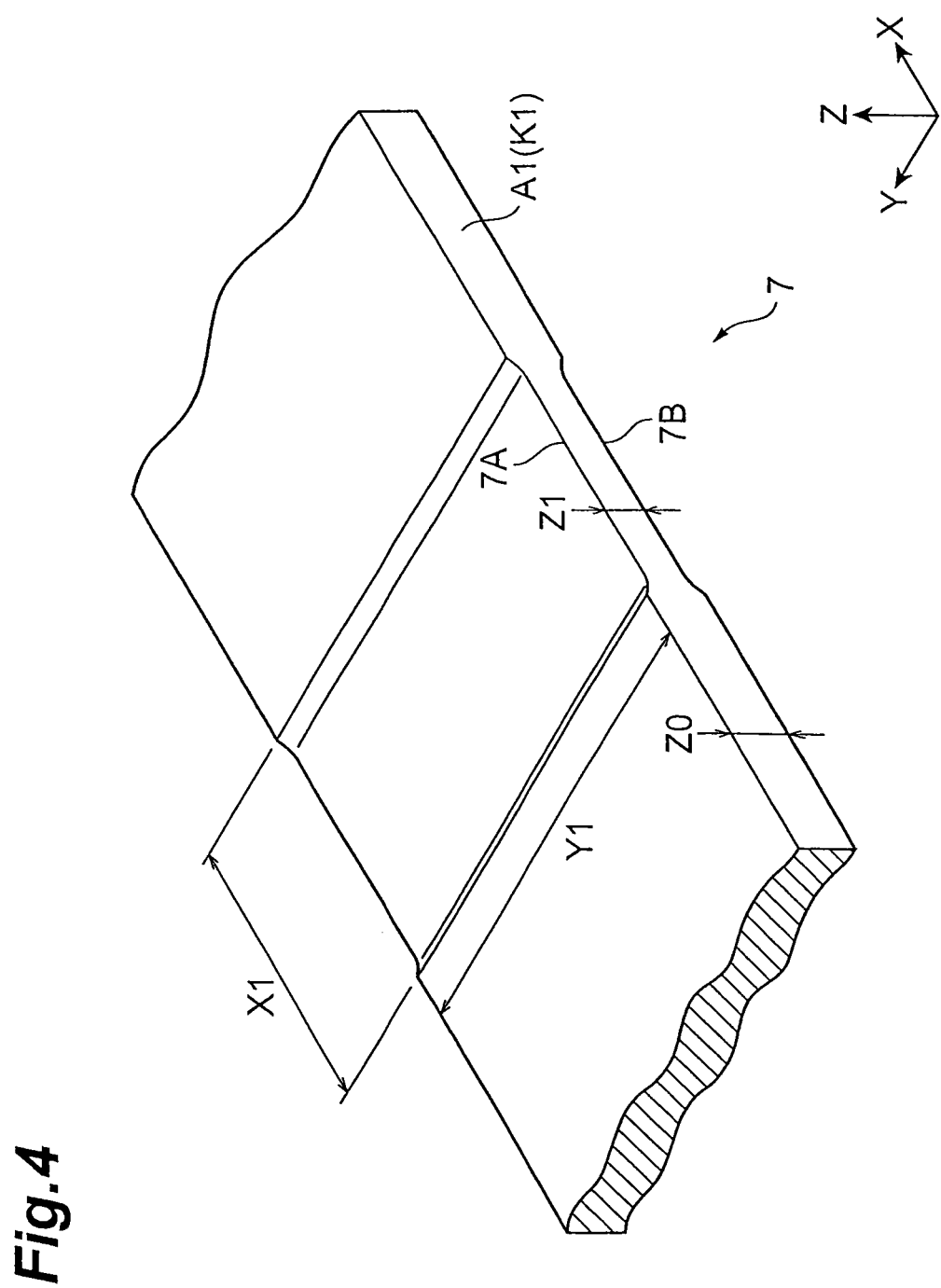
FIG. 4 is an enlarged perspective view of a flattening-processed region of a lead.

FIG. 4 is an enlarged perspective view of the flattening-processed region of the lead.

The size X2 in the X-axis direction of the seal part P1 illustrated in FIG. 3 is set slightly longer than the size X1 in the X-axis direction of the flattening-processed region 7 illustrated in FIG. 4. Since the resin layers R1, R1 extend over the whole area of the seal part P1, the differences in level on the upper and lower surfaces of the flattening-processed region 7 bite into the resin layers R1, R2, thereby restraining the lead A1 (K1) from moving in the X-axis direction. For the purpose of flattening, X2>X1 may be held true. The width Y1 of the lead A1 (K1) is set to 3.5 mm, for example.

Let 7A and 7B be the upper and lower faces of the flattening-processed region 7, respectively. They are substantially flat, Let Z1 and Z0 be the distance between the upper and lower faces of the flattening-processed region 7 and the distance between the upper and lower faces of the unprocessed region, respectively. As mentioned above, Z1<Z0. Preferably, the thickness Z1 satisfies 30 µm≦Z1≦200 µm. In this case, breaks tend to occur when the lower limit is not satisfied, while the lead surfaces are harder to be covered naturally when the upper limit is exceeded. That is the above-mentioned range is effective in covering the lead surfaces effortlessly and keeping a strength against tearing (keeping the leads from breaking) at the time of thermocompression bonding (at 180° C.). For example, the values of Z0 and Z1 are 100 µm and 80 µm, respectively.

The form of the YZ cross section of the flattening-processed region 7 will now be explained in detail.

FIG. 5(A) is a longitudinal sectional view (YZ cross section) of a unidirectionally curved lead, while FIG. 5(B) is a longitudinal sectional view (YZ cross section) of a lead curved like letter S. The lead is formed by thinly cutting a metal film with two blades coming into contact therewith. If the two blades come into contact with the same plane, the lead will carve in only one direction. If the blades come into contact with different planes, respectively, the lead will curve like letter S.

In FIG. 5(A), let L1 be the length of a line segment (AB) connecting one end (point A) of an arc in one direction of a curved surface of the lead A1 (K1) and a point (point B) extending from the one end (point A) and coming into contact with the lead A1 (K1), and let L2 be the maximum value of the shortest distance (distance between points C and D) from the line segment (AB) to the curved surface (lower face 7B) of the lead A1 (K1). When the curved surface is constructed by a circular arc, the point D is an intersection between a center line passing a widthwise midpoint and the curved surface.

Similarly, in FIG. 5(B), let L1 be the length of a line segment (XY) connecting one end (point X) of an arc in one direction of a curved surface of the lead A1 (K1) and a point (point Y) extending from the one end (point X) and coming into contact with the lead A1 (K1), and L2 be the maximum value of the shortest distance (distance to a point W of a line segment perpendicular to the line segment XY) from the line segment (XY) to the curved surface (lower face 7B) of the lead A1 (K1).

A line segment ST will additionally be explained in a similar manner. Let L1 be the length of the line segment (ST) connecting one end (point S) of an arc in one direction of a curved surface of the lead A1 (K1) and a point (point T) extending from the one end (point S) and coming into contact with the lead A1 (K1), and L2 be the maximum value of the shortest distance (distance to a point R of a line segment perpendicular to the line segment ST) from the line segment (ST) to the curved surface (upper face 7A) of the lead A1 (K1).

When each of the curved surfaces constructing letter S is constituted by a circular arc, intersections U, Z of a center line passing the widthwise midpoint and the upper and lower curved surfaces are respective inflection points of curves.

In the case of FIGS. 5(A) and 5(B), the curvature ratio R can be defined as R=L2/L1. In this case, 0<R≦2% in this embodiment. As mentioned above, the ratio $\alpha$ (=Z1/Z2) of the thickness Z1 of the lead to the thickness Z2 of the resin layers satisfies 30%≦$\alpha$≦60%.

The above-mentioned range inhibits the end portions A, X, S of the lead from sharpening, so that they are less likely to damage the resin layers and the metal films M1, M2 thereon and thereunder having thicknesses falling within specific ranges, thereby improving the hermetic property of the sealed package. Though the leads of this embodiment are totally different from those of the prior art, 0% is omitted from the curvature ratio R in order to clarify the difference from the theoretical prior art, while the curvature of the lead cut with a blade cannot completely be eliminated.

On the outside of the above-mentioned range, as illustrated in FIGS. 7(A) and 7(B), the lead A1 (K1) curves so greatly that, when the resin layers are thin, it may break through the resin layer in a depicted region J, thereby coming into contact with the metal film M2, thus causing liquids to leak out from within the package and the lead A1 (K1) to short-circuit through the metal films. Such disadvantages are remarkably ameliorated within the above-mentioned range.

In FIG. 5(A), i.e., within a cross section perpendicular to the longitudinal direction of the lead, the area S1 surrounded by the curved surface (lower face 7B) and the line segment (AB) preferably satisfies $0 < S1 \leq 0.02$ mm$^2$. Here, the area of 0.02 mm$^2$ is substantially obtained by a width of 3.5 mm with a distance d=10 μm. In FIG. 5(B), i.e., within a cross section perpendicular to the longitudinal direction of the lead, the area S2 surrounded by the curved surface (lower face 7B) and the line segment (XY) and the area 83 surrounded by the curved surface (upper face 7A) and the line segment (TS) satisfy $0 < S2 \leq 0.01$ mm$^2$ and $0 < S3 \leq 0.01$ mm$^2$.

This is effective in making it easier for the region defining the area S to be filled with the resin layers, thereby improving the hermetic property of the package.

As illustrated in FIGS. 7(C) and 7(D), it has been observed in the prior art that this space is filled with a gas AIR, so that the gas or electrolytic solution leaks from the seal part when the device is heated or the inner pressure is raised by an electrolysis of the electrolytic solution. Such disadvantages are remarkably ameliorated by this embodiment.

Figure 6:
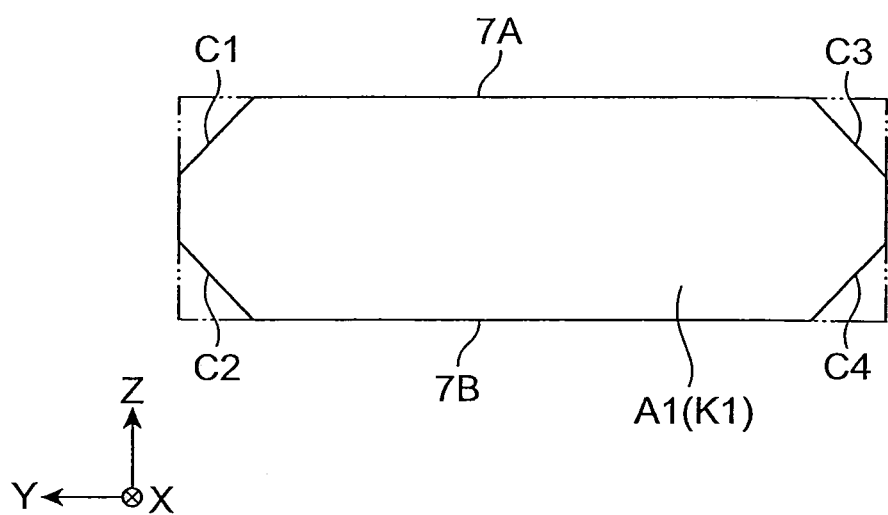
FIG. 6 is a longitudinal sectional view of a lead with processed corners.
Figure 7:
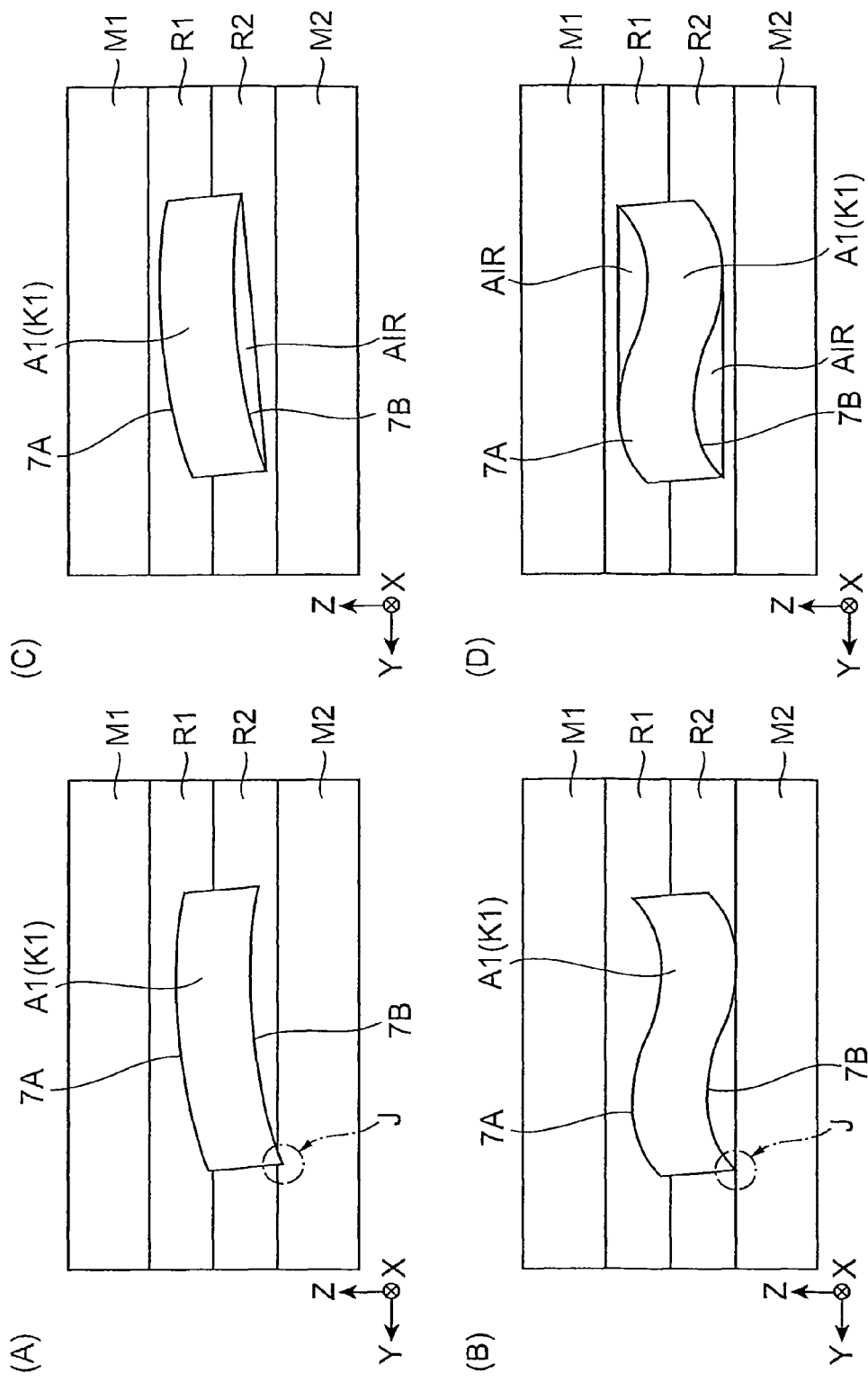
FIG. 7 is a longitudinal sectional view of leads under various conditions.

FIG. 6 is a longitudinal sectional view (YZ cross section) of a lead with processed corners.

For improving the filling property of the resin surrounding the lead A1 (K1) in the width direction, the four corners within the YZ plane may be obliquely cut along line segments (planes) C1, C2, C3, C4. Each of the planes C1 to C4 intersects two adjacent sides of the four sides within the YZ cross section. This can improve the filling property of the resin laterally of the lead, so as to prevent unfilled spaces from being formed in such portions and filled with air, thereby eliminating disadvantages mentioned above.

The following is a method for manufacturing the above-mentioned electro-chemical device.

First, the leads A1, K1 are processed by the press machine to flatten as mentioned above. Subsequently, the battery element 20 is prepared, and the leads A1, K1 are connected to its positive and negative electrodes, respectively. Next, the metal films M1, M2 having respective inner faces formed with the resin layers R1, R2 are prepared. The battery element 20 is put into the package P, and the seal part P1 at one side thereof is sealed by thermocompression bonding, while the remaining seal parts are left open as necessary. Subsequently, two of the remaining seal parts of thus constructed package P are sealed by thermocompression bonding, the electrolytic solution is introduced therein while the seal part at the remaining one side is open, for example, and the seal part at the last one side is thermocompression-bonded after introducing the electrolytic solution. This completes an electro-chemical device 10.

As explained in the foregoing, the method for manufacturing the electro-chemical device 10 in accordance with this embodiment comprises the steps of pressing at least a region located at the seal part P1 (see FIG. 3) of the leads A1, K1 so as to improve the flatness of the leads A1, K1, and arranging the leads A1, K1 with the improved flatness between the resin layers R1, R2 at the seal part P1 and thermocompression-bonding them together with the package P.

In this case, while the resin layers R1, R2 are softened at the time of thermocompression bonding so as to surround the leads closely, the leads A1, K1 have been flattened beforehand by pressing, so as to enhance the adhesion to the resin layers R1, R2, whereby the electro-chemical device 10 having a high quality is manufactured.

In this method for manufacturing the electro-chemical device 10, the pressure $P_P$ at the time of pressing and the pressure $P_T$ at the time of thermocompression bonding satisfy the relationship of $P_P > P_T$. Pressing under a pressure higher than that of typical thermocompression bonding is effective in improving the flatness of the leads A1, K1.

Preferably, the pressure $P_P$ at the time of pressing and the pressure $P_T$ at the time of thermocompression bonding satisfy the relationship of 2.0 kgf/cm$^2$ ($1.96 \times 10^5$ Pa)$\leq P_P \leq$ 6.0 kgf/cm$^2$ ($5.88 \times 10^5$ Pa) and 1.0 kgf/cm$^2$ ($0.98 \times 10^5$ Pa)$\leq P_T \leq$ 4.0 kgf/cm$^2$ ($3.92 \times 10^5$ Pa). This is effective in enabling thermocompression bonding while keeping the lead form unchanged from the time of pressing.

While aluminum is suitable as a material for the above-mentioned metal foil leads copper and the like may also be used. While a polymer resin (polypropylene) which is a hot-melt or thermoplastic resin is suitable as a material for the resin layers R1, R2, other resins may also be used. The above-mentioned electro-chemical device is also applicable to lithium-ion secondary batteries and the like other than the EDLC.

Examples of A-Type Electro-Chemical Devices

Experiments for making prototypes of the above-mentioned A-type electro-chemical devices were carried out. Examples will now be explained together with comparative examples.

Comparative Example 1

First, an electro-chemical device was made without processing the leads to flatten. An aluminum piece having a width Y1 of 3.5 mm and a thickness Z0 of 100 μm was used as a lead material, held within a package formed by coating inner faces of an A1 metal film with polypropylene resin layers (each having a thickness of 88 μm), and thermocompression-bonded (under a pressure of 3.0 kgf/cm$^2$ ($2.94 \times 10^5$ Pa) at a temperature of 180° C. for 7.0 see), so as to make an electro-chemical device (cell) containing no electrolytic solution, which yielded the problems mentioned above. When products exhibiting a resistance of less than 100 MΩ between the lead terminals were considered defective, the yield β1 was 60% in 50 samples. Here, the curvature ratio R=2.86% (0.1 mm/3.5 mm), and the area S1=0.18 mm$^2$.

Further, an electrolytic solution (1.5 mol/L, solution of TEA-BF$_4$/acetonitrile) for an electric double-layer capacitor was injected into the package, and thus obtained device was subjected to a charging/discharging test at a voltage of 2.5 to 1 V with a current of 50 mA within a temperature range of −40 to 80° C., whereby the electrolytic solution leaked out from the lead parts. Products exhibiting an electrolytic solution weight loss ratio of less than 1% (no leak trace) were taken as good items, while the others were considered defective. That is, when those exhibiting an electrolytic solution weight loss ratio of 1% or greater were considered defective, defective products occurred by 100% in 50 samples, whereby the yield β2 was 0% in 50 samples in this case. Here, "TEA-BF$_4$" is tetraethylammonium tetrafluoroborate, which is an electrolyte constituted by a quaternary ammonium salt. Comparative Example 1 represents the case where the ratio α of the lead thickness Z1 to the resin layer thickness Z2 (Z1/Z2)=60%.

That is, the results were as follows:

$Z1=Z0=100$ μm $Z2=166$ μm $\alpha=60\%$ $R=2.86\%$ $S=0.18$ mm$^2$ yield $\beta1=60\%$ yield $\beta2=0\%$ final yield $\beta=0\%$ Example 1

In Example 1, the area to be thermocompression-bonded was pressed as mentioned above under the same condition as that of Comparative Example 1. In the pressing, the area to be thermocompression-bonded was pressed at a pressure (4.0 kgf/cm$^2$=3.92×10$^5$ Pa) higher than that of thermocompression bonding (3.0 kgf/cm$^2$=2.94×10$^5$ Pa) with the A1 package which will be carried out later. As a consequence, the thickness of the A1 lead after the fattening decreased to 80 μm. The ratio $\alpha=Z1/Z2=80$ μm/166 μm=48%. The curvature ratio $R=0.14\%$ (=5 μm/3.5 mm), and the area $S1=0.009$ mm$^2$.

Subsequently, the lead seal parts were thermocompression-bonded as in Comparative Example 1. No electrolytic solution was injected into the package when measuring the yield $\beta1$. The electrolytic solution was injected into the package when measuring the yield $\beta2$. Except for the lead pressing, all the conditions for Example 1 were the same as those for Comparative Example 1.

As in Comparative Example 1, the electrolytic solution was injected into the package under the same condition, and the charging/discharging test was carried out under the same condition, whereby the yield $\beta1$ before the electrolytic solution injection was improved to 90%, so that good products exhibited a resistance of 100 MΩ or greater between the lead terminals. The defective products leaking the liquid after the liquid injection decreased to 20% in 50 samples, whereby the yield $\beta2=80\%$ in this case.

That is, the results were as follows:

$Z1=80$ μm $Z2=166$ μm $\alpha=48\%$ $R=0.14\%$ $S=0.009$ mm$^2$ yield $\beta1=90\%$ yield $\beta2=80\%$ final yield $\beta=72\%$ Experiments for changing the relationship between the lead thickness Z1 and the thickness Z2 of the polymer adhesion layer on the inside of the aluminum package were carried out.

Comparative Example 2

Where the Ratio $\alpha<30\%$

The conditions were the same as those of Example 1 except that the thickness Z1 of the A1 lead was 25 μm (after the pressing) and Z2=160 μm (80 μm×2). In this case, $\alpha=15\%$. As a result, the A1 lead thickness was so thin that the A1 lead itself was likely to be cut by a pressure at the time of thermocompression bonding. Among 50 samples, breaks occurred in 40, while 10 became good products. That is, the yield $\beta1$ before the electrolytic solution injection was 20%. The curvature ratio $R=0.085\%$, and the area $S1=0.0053$ mm$^2$. The depth of the deflected part was 3 μm.

That is the results were as follows:

$Z1=25$ μm $Z2=160$ μm $\alpha=15\%$ $R=0.85\%$ $S=0.0053$ mm$^2$ yield $\beta1=20\%$ yield $\beta2=28\%$ final yield $\beta=5.6\%$ Comparative Example 3

Were the Ratio $\alpha<30\%$

The conditions were the same as those of Example 1 except that the thickness. Z1 of the A1 lead was 80 μm (after the pressing) and Z2=500 μm (250 μm×2). In this case, $\alpha=16\%$. As a result, the resin layers were so thick that the lead position shifted at the time of thermocompression bonding. Among 50 samples, remarkable positional shifts occurred in 40, while 10 became good products. That is, the yield $\beta1$ before the electrolytic solution injection was 20%. The curvature ratio $R=0.14\%$ (=5 μm/3.5 mm), and the area $S1=0.009$ mm$^2$. The depth of the deflected part was 5 μm.

That is, the results were as follows:

$Z1=80$ μm $Z2=500$ μm $\alpha=16\%$ $R=0.14\%$ $S=0.009$ mm$^2$ yield $\beta1=20\%$ yield $\beta2=56\%$ final yield $\beta=11.2\%$ In the case of such a resin thickness, the resin lowers its flexibility after curing, so that its interface with the lead is likely to peel off. It is also unfavorable in that the total thickness of the device increases.

Comparative Example 4

Where the Ratio α>60%

The conditions were the same as those of Example 1 except that the thickness $Z1$ of the Al lead was 80 μm (after the pressing) and $Z2$=100 μm (50 μm×2). In this case, α=80%. The curvature ratio R=0.14% (=5 μm/3.5 mm), and, the area $S1$=0.009 mm². The depth of the deflected part was 5 μm. As a result, the yield β1 of the empty cell before injecting the electrolytic solution was 56% and thus was lower than the yield (90%) of Example 1, though the effect of lead pressing (deburring) was seen. This seems to be because the resin layers were thinner as compared with the lead thickness and thus failed to cover the lead sufficiently, thereby causing short-circuiting. As for the liquid leak after the electrolytic solution injection, the yield β2 was 26%.

That is, the results were as follows:

$Z1$=80 μm $Z2$=100 μm

α=80%

$R$=0.14%(=5 μm/3.5 mm)

$S$=0.009 mm² yield β1=56% yield β2=26% final yield β=14.6%

Example 2

Where the Ratio α=50%

The conditions were the same as those of Example 1 except that the thickness $Z1$ of the Al lead was 90 μm (after the pressing) and $Z2$=180 μm (90 μm×2). In this case, α=50%. The curvature ratio R=0.14% (=5 μm/3.5 mm), and the area $S1$=0.009 mm². The depth of the deflected part was 5 μm. As a result, the yield β1 of the empty cell before injecting the electrolytic solution was 80% and thus was lower than the yield (90%) of Example 1, though the effect of lead pressing (deburring) was seen. This seems to be because the resin layers were thinner as compared with the lead thickness and thus failed to cover the lead sufficiently, thereby causing short-circuiting. As for the liquid leak after the electrolytic solution injection, the yield in was 90%.

That is the results were as follows:

$Z1$=90 μm $Z2$=180 μm

α=50%

$R$=0.14%(=5 μm/3.5 mm)

$S$=0.009 mm² yield β1=80% yield β2=90% final yield β=72%

Comparative Example 5

Where the Ratio R>2% (Where the Lead Width was Narrowed)

The conditions were the same as those of Example 1 except that the width $Y1$ of the Al lead was 0.5 mm, an aluminum (Al) piece having a thickness $Z1$ of 80 μm (after the pressing) was used, and $Z2$=160 μm (80 μm×2), in this case, α=50%. As a result, the yield β1 of the empty cell before injecting the electrolytic solution was 84% (42 items) and thus was lower than the yield (90%) of Example 1, though the effect of lead pressing (deburring) was seen. As for the liquid leak after the electrolytic solution injection, however, the yield β2 was 32%.

This was the leakage from the curved part because of the fact that the flexure strength was increased by narrowing the lead width so that the lead deformed insufficiently. As a result, among 50 samples, the leakage occurred in 25. The curvature ratio R=4.0% (=20 μm/0.5 mm), and the area $S1$=0.02 mm².

That is, the results were as follows:

$Y1$=0.5 mm $Z1$=80 μm $Z2$=160 μm

α=50%

$R$=4.0%(=0.02 mm/0.5 mm)

$S$=0.02 mm² yield β1=84% yield β2=32% final yield β=26.9%

Comparative Example 6

Where the Ratio R>2% (Where the Pressing Pressure was Lowered)

While the Al width $Y1$=3.5 mm, the thickness $Z1$=80 μm (after the pressing), and $Z2$=160 μm (80 μm×2), pressing (not exceeding the pressing range) was carried out at a pressure of 1 kgf/cm² (0.98×10⁵ Pa). The curvature ratio R=2.28% at this time. Thermocompression bonding (under a pressure of 3.0 kgf/cm² (2.94×10⁵ Pa) at a temperature of 180° C. for 7.0 sec) was carried out, so as to make an electro-chemical device (cell) containing no electrolytic solution, which yielded the problems mentioned above. When products exhibiting a resistance of less than 100 MΩ between the lead terminals were considered defective, the yield β1 was 32% in 50 samples. As for the liquid leak after the electrolytic solution injection, the yield β2 was 44% (22 items). They were caused by insufficient curvature corrections due to the deficiency in pressing pressure. Here, the curvature ratio R=2.28% (=0.08 mm/3.5 mm), and the area $S1$=0.14 mm².

That is, the results were as follows:

$Y1 = 3.5$ mm $Z1 = 80$ µm $Z2 = 80$ µm $\alpha = 50\%$ $R = 2.28\% (= 0.08$ mm$/3.5$ mm$)$ $S = 0.14$ mm$^2$ yield $\beta 1 = 32\%$ yield $\beta 2 = 44\%$ final yield $\beta = 14.1\%$ Next, the condition was changed for the range of Z1 as well.

Comparative Example 7

Where Z1<30 µm (Where the Lead was Thin)

An aluminum piece having a width Y1 of 3.5 mm and a thickness Z0 of 40 µm as a lead material was pressed such that Z1=20 µm. Thus obtained product was held within a package formed by coating inner faces of an Al metal film with polypropylene resin layers (having a thickness of 80 µm each×2=160 µm), and thermocompression-bonded (under a pressure of 3.0 kgf/cm$^2$ (2.94×10$^5$ Pa) at a temperature of 180° C. for 7.0 sec), so as to make an electro-chemical device (cell) containing no electrolytic solution, which yielded the problems mentioned above. When products exhibiting a resistance of less than 100 MΩ between the lead terminals were considered defective, the yield β1 was 25% in 50 samples. As for the liquid leak after the electrolytic solution injection, the yield β2 was 45%. Here, the curvature ratio R=0.29% (=0.01 mm/3.5 mm), and the area S1=0.02 mm$^2$.

That is, the results were as follows:

$Y1 = 3.5$ mm $Z0 = 40$ µm $Z1 = 20$ µm $Z2 = 160$ µm $\alpha = 25\%$ $R = 0.29\%$ $S = 0.02$ mm$^2$ yield $\beta 1 = 25\%$ yield $\beta 2 = 45\%$ final yield $\beta = 11.3\%$

Comparative Example 8

Where Z1>200 µm (Where the Lead was Thick)

An aluminum piece having a width. Y1 of 10 mm and a thickness Z0 of 250 µm as a lead material was pressed such that Z1=80 µm. Thus obtained product was held within a package formed by coating inner faces of an Al metal film with polypropylene resin layers (having a thickness of 80 µm each×2=160 µm), and thermocompression-bonded (under a pressure of 3.0 kgf/cm$^2$ (2.94×10$^5$ Pa) at a temperature of 180° C. for 7.0 sec), so as to make an electro-chemical device (cell) containing no electrolytic solution, which yielded the problems mentioned above. When products exhibiting a resistance of less than 100 MΩ between the lead terminals were considered defective, the yield β1 was 14% (7 items) in 50 samples. Liquid leak was seen in all the measurable samples, whereby the yield β after the liquid injection was 0%.

This was because the lead thickness Z1 was so large that the lead was likely to penetrate through the resin layers and cause short-circuiting. Also, its thickness made it harder to trace the aluminum package and fill gaps with polypropylene.

Here, the curvature ratio R=1.5% (=0.15 mm/10.0 mm), and the area S1=0.75 mm$^2$.

That is, the results were as follows:

$Y1 = 10.0$ mm $Z0 = 250$ µm $Z1 = 80$ µm $Z2 = 160$ µm $\alpha = 138\%$ $R = 1.5\%$ $S = 0.75$ mm$^2$ yield $\beta 1 = 14\%$ yield $\beta 2 = 0\%$ final yield $\beta = 0\%$ Next, the pressures $P_P$ and $P_T$ were changed.

Comparative Example 9

Where $P_P$>6 kgf/cm$^2$ (5.88×10$^5$ Pa) (Strong Pressing)

An aluminum piece having a width Y1 of 3.5 mm and a thickness Z0 of 100 µm as a lead material was pressed at 7.0 kgf/cm$^2$ (6.86×10$^5$ Pa), so that Z1=50 µm (in 50 samples). At this stage, however, all the leads were seen to break partly, bend transversely, and so forth, thus exhibiting problems. When samples were subsequently made as mentioned above, the yield β1 was 20% (10 items), and the yield β2 was 16% (8 items).

The pressing pressure that is too high is considered unfavorable because it causes leads to deform too much, thereby making them break and twist.

The curvature ratio R was unmeasurable because of distortions.

That is, the results were as follows:

$Y1 = 3.5$ mm $Z0 = 100$ µm $Z1 = 50$ µm $Z2 = 160$ µm $P_P = 7.0$ kgf/cm$^2$(6.86×10$^5$ Pa)

α=59%

R=immeasurable

S=measurable yield β1=20% yield β2=16% final yield β=12%

Example 3

Where the Ratio α=56%

The conditions were the same as those of Example 1 except that the thickness Z1 of the A1 lead was 90 μm (after the pressing) and Z2=160 μm (80 μm×2), in this case, α=56%, and the following results were obtained.

Z1=90 μm

Z2=160 μm

α=56%

R=0.14%(=5 μm/3.5 mm)

S=0.009 mm$^2$ yield β1=82% yield β2=75% final yield β=61.5%

Example 4

Where the Ratio α=47%

The conditions were the same as those of Example 3 except that the thickness Z1 of the A1 lead was 75 μm (after the pressing), Z2=160 μm (80 μm×2), and $P_P$ (Pa)=4.31×10$^5$ Pa. In this case, α=47%, and the following results were obtained.

Z1=75 μm

Z2=160 μm

α=47%

R=0.14%(=5 μm/3.5 mm)

S=0.009 mm$^2$ $P_P$=4.31×10$^5$ Pa $P_T$=2.94×10$^5$ Pa yield β1=90% yield β2=88% final yield β=79.2%

Example 5

Where the Ratio α=41%

The conditions were the same as those of Example 3 except at the thickness Z1 of the A1 lead was 65 μm (after the pressing), Z2=160 μm (80 μm×2), and $P_P$ (Pa)=4.16×10$^5$ Pa. In this case, α=41%, and the following results were obtained.

Z1=65 μm

Z2=160 μm

α=41%

R=0.14%(=5 μm/3.5 mm)

S=0.009 mm$^2$ $P_P$=4.16×10$^5$ Pa $P_T$=2.94×10$^5$ Pa yield β1=84% yield β2=90% final yield β=75.6%

Example 6

Where the Ratio α=34%

The conditions were the same as those of Example 3 except that the thickness Z1 of the A1 lead was 60 μm (after the pressing), Z2=160 μm (80 μm×2), and $P_P$ (Pa)=3.92×10$^5$ Pa. In this case, α=34%, and the following results were obtained.

Z1=60 μm

Z2=160 μm

α=34%

R=0.14%(=5 μm/3.5 mm)

S=0.009 mm$^2$ $P_P$=3.92×10$^5$ Pa $P_T$=2.94×10$^5$ Pa yield β1=78% yield β2=90% final yield β=70.2%

Example 7

Where the Ratio α=56%

The conditions were the same as those of Example 3 except that the thickness Z1 of the A1 lead was 28 μm (after the pressing), $Z2=50$ μm ($25$ μm×2), and $P_P$ (Pa)=$3.92\times10^5$ Pa. In this case, $\alpha=56\%$, and the following results were obtained.

$Z1=28$ μm $Z2=50$ μm $\alpha=56\%$ $R=0.14\%(=5$ μm/3.5 mm)

$S=0.009$ mm$^2$ $P_P=3.92\times10^5$ Pa $P_T=2.94\times10^5$ Pa yield $\beta1=42\%$ yield $\beta2=96\%$ final yield $\beta=40.3\%$ Example 8

Where the Ratio $\alpha=56\%$

The conditions were the same as those of Example 3 except that the thickness $Z1$ of the Al lead was 205 μm (after the pressing), $Z2=366$ μm (183 μm×2), and $P_P$ (Pa) $3.92\times10^5$ Pa. In this case, $\alpha=56\%$, and the following results were obtained.

$Z1=205$ μm $Z2=366$ μm $\alpha=56\%$ $R=0.14\%(5$ μm/3.5 mm)

$S=0.009$ mm$^2$ $P_P=3.92\times10^5$ Pa $P_T=2.94\times10^5$ Pa yield $\beta1=78\%$ yield $\beta2=62\%$ final yield $\beta=48.4\%$ Example 9

Where $P_P<2$ kgf/cm$^2$ ($1.96\times10^5$ Pa) and $P_P>P_T$ (Weak Pressing)

An aluminum piece having a width $Y1$ of 3.5 mm and a thickness $Z0$ of 100 μm as a lead material was pressed at 1.5 kgf/cm$^2$ ($1.47\times10^5$ Pa), so that $Z1=95$ μm. Thus obtained product was held within a package formed by coating inner faces of an Al metal film with polypropylene resin layers (having a thickness of 80 μm each×2=160 μm), and thermocompression-bonded (under a pressure of 3.0 kgf/cm$^2$ ($2.94\times10^5$ Pa) at a temperature of 180° C. for 7.0 sec), so as to make an electro-chemical device (cell) containing no electrolytic solution. In 50 samples, the yield $\beta1$ was 70% (35 items), and the yield $\beta2$ was 74% (37 items).

Since $\beta1$ was not so different from that obtained with no processing, $P_P$ was deemed to be insufficient for debating. However, it was considered to be somewhat effective in removing the curvature of leads, thereby improving the unleaked, yield $\beta2$.

Here, the curvature ratio R=1.43% (=0.05 mm/3.5 mm), and the area $S1=0.03$ mm$^2$.

That is, the results were as follows:

$Y1=3.5$ mm $Z0=100$ μm $Z1=95$ μm $Z2=160$ μm $P_P=1.5$ kgf/cm$^2$($1.47\times10^5$ Pa)

$\alpha=59\%$ $R=1.43\%$ $S1=0.03$ mm$^2$ yield $\beta1=70\%$ yield $\beta2=74\%$ final yield $\beta=51.8\%$ Example 10

Where the Initial Pressing Pressure was Raised while the Ratio $\alpha=59\%$

The conditions were the same as those of Example 9 except that the thickness $Z1$ of the Al lead was 95 μm (after the pressing), $Z2=160$ μm ($80$ μm×2), R=0.05%, $S1=0.005$ mm$^2$, and $P_P$ (Pa)=$6.01\times10^5$ Pa. In this case, $\alpha=59\%$, and the following results were obtained.

$Z1=95$ μm $Z2=160$ μm $\alpha=59\%$ $R=0.05\%$ $S=0.005$ mm$^2$ $P_P=6.01\times10^5$ Pa $P_T=2.94\times10^5$ Pa yield $\beta1=84\%$ yield $\beta2=72\%$ final yield $\beta=60.5\%$ Example 11

Where $P_T<1$ kgf/cm$^2$ ($0.98\times10^5$ Pa) (Weak Thermocompression Bonding)

An aluminum piece having a width $Y1$ of 3.5 van and a thickness $Z0$ of 100 μm as a lead material was pressed at 4.0 kgf/cm$^2$ ($3.92\times10^5$ Pa), so that $Z1=77$ μm. Thus obtained product was held within a package formed by coating inner faces of an Al metal film with polypropylene resin layers (having a thickness of 65 μm each×2), and thermocompression-bonded (under a pressure of 0.8 kgf/cm$^2$ (0.78×10$^5$ Pa) at a temperature of 180° C. for 7.0 sec), so as to make an electro-chemical device (cell) containing no electrolytic solution. In 50 samples, the yield β1 was 82% (35 items), and the yield β2 was 64% (32 items).

The value of β1 suggested that the deburring effect appeared, thereby making it harder to short-circuit. On the other hand, the value of β2 indicated that the thermocompression bonding pressure was insufficient, whereby $P_P$ was not considered to be enough for deburring. However, it was deemed to be somewhat effective in removing the curvature of leads, thereby improving the unleaked yield β2.

Here, the curvature ratio R=0.143% (=0.005 mm/3.5 mm), and the area (S1=0.009 mm$^2$.

That is, the following results were obtained.

$Y1$=3.5 mm $Z0$=100 μm $Z1$=77 μm $Z2$=130 μm $P_P$=3.92×10$^5$ Pa $P_T$=0.78×10$^5$ Pa

α=59%

$R$=0.143%

$S$=0.009 mm$^2$ yield β1=82% yield β2=64% final yield β=52.5%

Example 12

Where $P_T$>4 kgf/cm$^2$ (3.92×10$^5$ Pa) (Strong Thermocompression Bonding)

An aluminum piece having a width Y1 of 3.5 mm and a thickness Z0 of 100 μm as a lead material was pressed at 4.0 kgf/cm$^2$ (192×10$^5$ Pa), so that Z1=77 μm. Thus obtained product was held within a package formed by coating inner faces of an Al metal film with polypropylene resin layers (having a thickness of 80 μm each), and thermocompression-bonded (under a pressure of 5.0 kgf/cm$^2$ (4.90×10$^5$ Pa) at a temperature of 180° C. for 7.0 sec), so as to make an electro-chemical device (cell) containing no electrolytic solution. In 50 samples, the yield β1 was 88% (44 items), and the yield β2 was 74% (37 items).

The value of β1 seemed to suggest that, while the deburring effect by the pressing was more than sufficient, the pressure at the time of thermocompression bonding was so high that the leads penetrated through the resin layers.

Here, the curvature ratio R=0.1.43% (=0.005 mm/3.5 mm), and the area S1=0.009 mm$^2$.

That is, the following results were obtained.

$Y1$=3.5 mm $Z0$=100 μm $Z1$=77 μm $Z2$=130 μm $P_P$=4.0 kgf/cm$^2$(3.92×10$^5$ Pa)

$P_T$=5.0 kgf/cm$^2$(4.90×10$^5$ Pa)

α=59%

$R$=0.143%

$S$=0.009 mm$^2$ yield β1=88% yield β2=74% final yield β=65.1%

Example 13 to 17

In Examples 13 to 17, experiments were carried out while changing only the area S and initial pressing pressure $P_P$ in Example 1.

Summary of Evaluation

The following tables list the results of the above-mentioned experiments.

TABLE 1-1

| | α(%) | R(%) | Z1(μm) | S(mm$^2$) | $P_P$ (×10$^5$ Pa) | $P_T$ (×10$^5$ Pa) | $P_P$-$P_T$ (Pa) | plus/minus sign of $P_P$-$P_T$ |
|---|---|---|---|---|---|---|---|---|
| Preferable range satisfied by Examples | 30% ≤ α ≤ 60% | 0 < R ≤ 2% | 30 μm ≤ Z1 ≤ 200 μm | 0 < S ≤ 0.02 mm$^2$ | 1.96 × 10$^5$ Pa ≤ $P_P$ ≤ 5.88 × 10$^5$ Pa | 0.98 × 10$^5$ Pa ≤ $P_T$ ≤ 3.92 × 10$^5$ Pa | | plus |
| Comparative Example1 | 60 | 2.86 | 100 | 0.18 | 0 | 3 | −3 | minus |
| Comparative Example2 | 15 | 0.085 | 25 | 0.0053 | 3.92 | 2.94 | 0.98 | plus |
| Comparative Example3 | 16 | 0.14 | 80 | 0.009 | 3.92 | 2.94 | 0.98 | plus |
| Comparative Example4 | 80 | 0.14 | 80 | 0.009 | 3.92 | 2.94 | 0.98 | plus |
| Comparative Example5 | 50 | 4 | 80 | 0.02 | 3.92 | 2.94 | 0.98 | plus |

TABLE 1-1-continued

|  | α(%) | R(%) | Z1(μm) | S(mm²) | $P_P$ (×10⁵ Pa) | $P_T$ (×10⁵ Pa) | $P_P$-$P_T$ (Pa) | plus/minus sign of $P_P$-$P_T$ |
|---|---|---|---|---|---|---|---|---|
| Comparative Example6 | 50 | 2.28 | 80 | 0.14 | 0.98 | 2.94 | −1.96 | minus |
| Comparative Example7 | 25 | 0.29 | 20 | 0.02 | 3.92 | 2.94 | 0.98 | plus |
| Comparative Example8 | 138 | 1.5 | 80 | 0.75 | 3.92 | 2.94 | 0.98 | plus |
| Comparative Example9 | 59 | unmeasurable | 50 | unmeasurable | 6.86 | — | — | — |

TABLE 1-2

|  | α(%) 30% ≤ α ≤ | R(%) 0 < R ≤ 2% | Z1(μm) 30 μm ≤ Z1 ≤ 200 μm | S(mm²) 0 < S ≤ 0.02 mm² | $P_P$ (×10⁵Pa) 1.96×10⁵ Pa ≤ $P_P$ ≤ 5.88×10⁵ Pa | $P_T$ (×10⁵Pa) 0.98×10⁵ Pa ≤ $P_T$ ≤ 3.92×10⁵ Pa | $P_P - P_T$(Pa) | plus/minus sign of $P_P - P_T$ |
|---|---|---|---|---|---|---|---|---|
| Preferable range satisfied by Examples | 60% | R ≤ 2% | 200 μm | 0.02 mm² | 5.88 × 10⁵ Pa | 3.92 × 10⁵ Pa | | plus |
| Example 1 | 48 | 0.14 | 80 | 0.009 | 3.92 | 2.94 | 0.98 | plus |
| Example 2 | 50 | 0.14 | 90 | 0.009 | 3.92 | 2.94 | 0.98 | plus |
| Example 3 | 56 | 0.14 | 90 | 0.009 | 4.7 | 2.94 | 1.76 | plus |
| Example 4 | 47 | 0.14 | 75 | 0.009 | 4.31 | 2.94 | 1.37 | plus |
| Example 5 | 41 | 0.14 | 65 | 0.009 | 4.16 | 2.94 | 1.22 | plus |
| Example 6 | 34 | 0.14 | 60 | 0.009 | 3.92 | 2.94 | 0.98 | plus |
| Example 7 | 56 | 0.14 | 28 | 0.009 | 3.92 | 2.94 | 0.98 | plus |
| Example 8 | 56 | 0.14 | 205 | 0.009 | 3.92 | 2.94 | 0.98 | plus |
| Example 9 | 59 | 1.43 | 95 | 0.03 | 1.47 | 2.94 | −1.47 | minus |
| Example 10 | 59 | 0.05 | 95 | 0.005 | 6.01 | 2.94 | 3.07 | plus |
| Example 11 | 59 | 0.143 | 77 | 0.009 | 3.92 | 0.78 | 3.14 | plus |
| Example 12 | 59 | 0.143 | 77 | 0.009 | 3.92 | 4.9 | −0.98 | minus |
| Example 13 | 48 | 0.14 | 80 | 0.015 | 3.14 | 2.94 | 0.20 | plus |
| Example 14 | 48 | 0.14 | 80 | 0.018 | 2.74 | 2.94 | −0.20 | minus |
| Example 15 | 48 | 0.14 | 80 | 0.02 | 2.55 | 2.94 | −0.39 | minus |
| Example 16 | 48 | 0.14 | 80 | 0.025 | 2.16 | 2.94 | −0.78 | minus |
| Example 17 | 48 | 0.14 | 80 | 0.03 | 1.96 | 2.94 | −0.98 | minus |

TABLE 2-1

|  | β1(n = 50) | | β2(n = 50) | | β = (β1 × β2) |
|---|---|---|---|---|---|
|  | β1(%) | Remainder | β2(%) | Remainder | (%) |
| Preferable range satisfied by Examples | — | — | — | — | 30% ≤ β |
| Comparative Example 1 | 18 | 9 | 0 | 0 | 0.0 |
| Comparative Example 2 | 20 | 10 | 28 | 14 | 5.6 |
| Comparative Example 3 | 20 | 10 | 56 | 28 | 11.2 |
| Comparative Example 4 | 56 | 28 | 26 | 13 | 14.6 |
| Comparative Example 5 | 84 | 42 | 32 | 16 | 26.9 |
| Comparative Example 6 | 32 | 16 | 44 | 22 | 14.1 |
| Comparative Example 7 | 25 | 12.5 | 45 | 23 | 11.3 |
| Comparative Example 8 | 14 | 7 | 0 | 0 | 0.0 |
| Comparative Example 9 | 20 | 10 | 16 | 8 | 3.2 |

TABLE 2-2

|  | β1(n = 50) | | β2(n = 50) | | β = (β1 × β2) |
|---|---|---|---|---|---|
|  | β1(%) | Remainder | β2(%) | Remainder | (%) |
| Preferable range satisfied by Examples | — | — | — | — | 30% ≤ β |
| Example 1 | 90 | 45 | 80 | 40 | 72.0 |
| Example 2 | 80 | 40 | 90 | 45 | 72.0 |
| Example 3 | 82 | 41 | 75 | 38 | 61.5 |
| Example 4 | 90 | 45 | 88 | 44 | 79.2 |
| Example 5 | 84 | 42 | 90 | 45 | 75.6 |
| Example 6 | 78 | 39 | 90 | 45 | 70.2 |
| Example 7 | 42 | 21 | 96 | 48 | 40.3 |
| Example 8 | 78 | 39 | 62 | 31 | 48.4 |
| Example 9 | 70 | 35 | 74 | 37 | 51.8 |
| Example 10 | 84 | 42 | 72 | 36 | 60.5 |
| Example 11 | 82 | 41 | 64 | 32 | 52.5 |
| Example 12 | 88 | 44 | 74 | 37 | 65.1 |
| Example 13 | 84 | 42 | 74 | 37 | 62.2 |
| Example 14 | 54 | 27 | 64 | 32 | 34.6 |
| Example 15 | 64 | 32 | 64 | 32 | 41.0 |
| Example 16 | 67 | 33.5 | 64 | 32 | 42.9 |
| Example 17 | 72 | 36 | 64 | 32 | 46.1 |

(1) In the case where 30% ≤ α ≤ 60% while 0 < R ≤ 2% as an object structure, as evidenced by Examples 1 to 12, the final yield β (β1×β2) exceeded 30%, mostly 40%, when the pressing was appropriately carried out.

In the above-mentioned examples, flattening the aluminum foil leads seemed to reduce curvatures and deflections therein, so as to collapse burrs, thereby exerting a pressure uniformly on the aluminum foil leads at the time of thermocompression-bonding the aluminum package, thus restraining the leads from penetrating through the resin layers (which reduces short circuits). Also, the examples improved the adhesion to the resin layers and reduced gas and liquid leaks. That is, when the lead thickness Z1 falls within the range of at least 30% but not exceeding 60% of the resin layer thickness Z2 (30%≦α≦60%) as in the examples, effects similar to those of Example 1 were seen, whereby electro-chemical devices with high qualities were obtained.

When the ratio α is smaller than the lower limit (30%) as in Comparative Examples 2, 3, and 7, the form of side end portions of leads tended to be emphasized and cause shifting during thermocompression bonding and breaks in the A1 leads, thereby making it easier for gases to leak out from bonded interfaces (generate gaps). When the value α exceeded the upper limit (60%) as in Comparative Examples 4 and 8, the resin layers failed to cover the leads completely, thereby yielding defective products.

(2) As evidenced by Examples 1 to 8, 10, 11, and 13, appropriate pressing required that the pressing pressure $P_P$ as preprocessing be higher than the pressing pressure $P_T$ at the time of thermocompression bonding. The final yield β=(β1× β2) exceeded 40% in this case as well. When the absolute value of the pressure $P_T$ at the time of thermocompression bonding was too small even in the case where the relationship mentioned above held true, e.g., in Example 11 ($P_T$=0.78×10$^5$ Pa), the degree of sealing was not sufficiently high, whereby the yield was lower than that of Example 10 as a mater of course. When the absolute value was too large, i.e., when it exceeded the pressure of Example 12 ($P_T$=4.90×10$^5$ Pa), parts to be pressed were damaged and so forth at the time of sealing as the case might be. Hence, with some margins (of 0.2×10$^5$ Pa and 0.98×10$^5$ Pa for the lower and upper limits, respectively), the pressure $P_T$ preferably satisfies 0.98×10$^5$ Pa≦$P_T$≦3.92×10$^5$ Pa. In this case, as in Examples 1 to 10, sufficient sealing can be carried out while suppressing damages. During pressing as preprocessing for thermocompression bonding, the pressure $P_P$ higher than that of thermocompression bonding by about 10$^5$ Pa can be allowed, since there, is no package. Therefore, the pressure $P_P$ preferably satisfies 1.96×10$^5$ Pa≦$P_P$≦5.88×10$^5$ Pa, so as to be slightly higher than $P_T$.

(3) As evidenced by Examples 1 to 6 and 9 to 13, the lead thickness Z1 preferably satisfies 30 μm≦Z1≦200 μm in order for the yield to exceed 50%. In this case, the yield can be raised.

When the area S after the initial pressing (substantially equal to the area after thermocompression bonding) was 0.02 mm$^2$ or less (Examples 1 to 15), the final yield exceeded 30%, e.g., 72% in Example 1. When the area exceeded this limit, i.e., was on the outside of the range of 0<S≦0.02 mm$^2$, the final yield was inferior to that of Example 1 as in Examples 16 and 17.

The B-type electro-chemical devices will now be explained.

Figure 8:
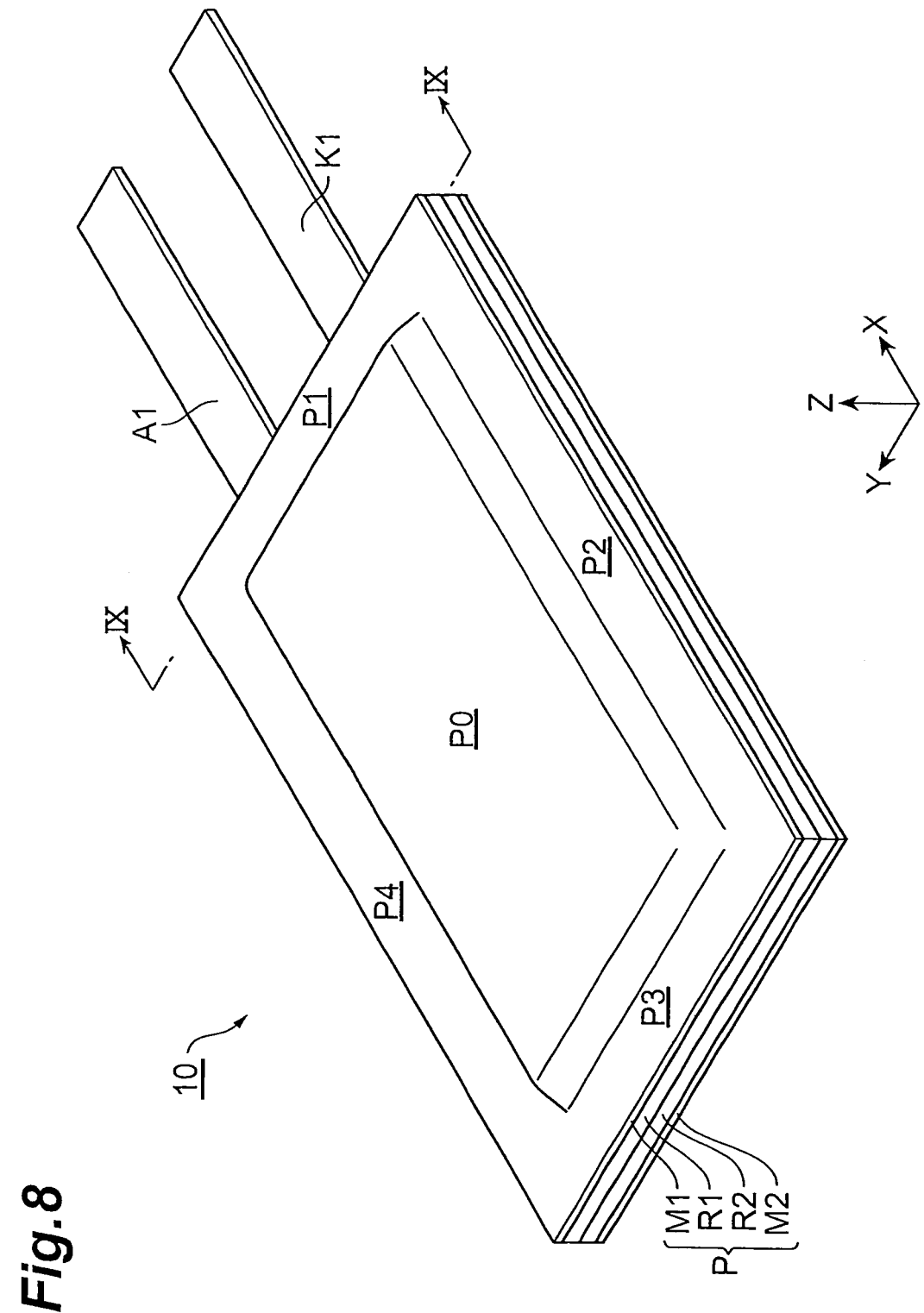
FIG. 8 is a perspective view of an electro-chemical device.
Figure 10:
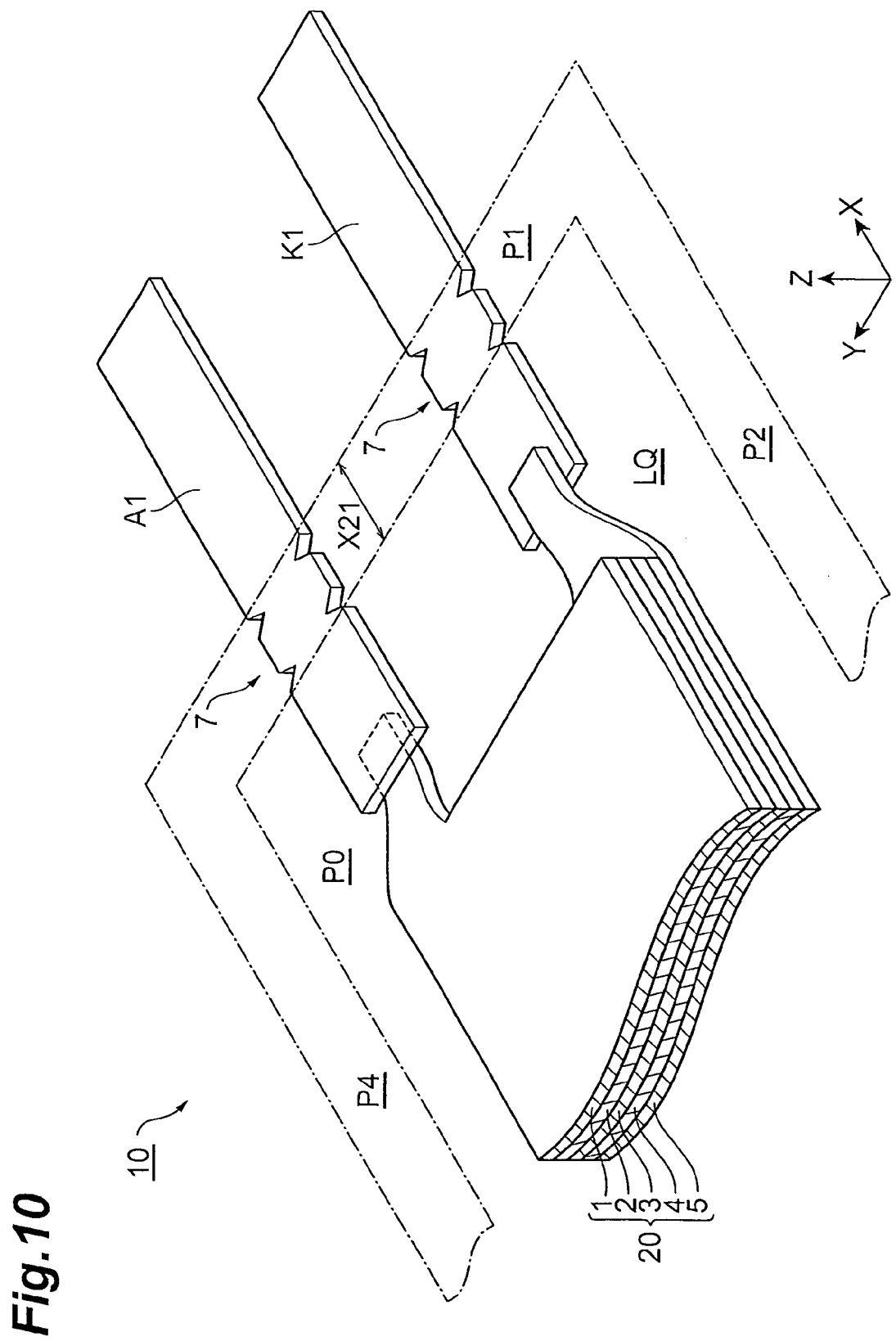
FIG. 10 is an enlarged perspective view of a seal part of an electro-chemical device and its vicinity.

FIG. 8 is a perspective view of a B-type electro-chemical device. FIG. 9 is a sectional view of the electro-chemical device taken along the line IX-IX of FIG. 8. FIG. 10 is an enlarged perspective view of a seal part of the electro-chemical device in accordance with an embodiment and its vicinity.

In these drawings, an XYZ three-dimensional orthogonal coordinate system is set as illustrated.

This electro-chemical device is an electric double-layer capacitor (EDLC) comprising a package P including metal films M1, M2, a battery element 20 (see FIG. 10) sealed within the package P, resin layers R1, R2 disposed at least on the inside of a seal part (top seal part) P1 of the package P, and leads A1, K1 extending from the battery element 20 to the outside of the package P through between the resin layers R1, R2 at the seal part P1 of the package P. The leads A1, K1 extend along the X axis, while their width and thickness directions coincide with the Y and Z axes, respectively. The resin layers R1, R2 are made of polymer films constituted by polypropylene or the like.

The resin layers R1, R2 are attached to the whole inner faces of the metal films M1, M2, respectively, but may be disposed at only the seal parts P1, P2, P3, P4 in peripheries of the four sides of the rectangular package P on the metal films M1, M2. The seal parts P1, P2, P3, P4 are sealed by thermocompression bonding. The battery element 20 is arranged within a center region P0 surrounded by the seal parts P1, P2, P3, P4 at the four sides of the package P. A voltage can be applied between the lead A1 acting as an anode and the lead K1 acting as a cathode, so as to charge the battery element 20, and the power charged in the battery element 20 can be taken out from the leads.

Referring to FIG. 9, let Z0, Z2, and Z3 be the thickness of the lead A1 (K1) at the seal part P1 (which becomes Z1 when the seal part is pressed), total thickness of the resin layers R1, R2, and total thickness of the package, respectively.

Numerous structures can be considered for the battery element 20 illustrated in FIG. 10. As an electrode on the anode (positive electrode) side, one combining a current collector 1 made of a foil of a metal such as aluminum or copper and a polarizable electrode 2 made of an activated carbonaceous structure together is used in this example. As an electrode on the cathode (negative electrode) side, one combining a current collector 5 made of a foil of a metal such as aluminum and a polarizable electrode 4 made of an activated carbonaceous structure together is used in this example. A separator 3 is disposed between the positive and negative electrodes. While a plurality of battery elements may be laminated as a matter of course, an example accommodating only one battery element is illustrated here for simplicity.

Each of the polarizable electrodes 2, 4 is made of a porous material, which is manufactured by mixing a binder resin with activated carbon. Examples of the binder resin include fluorine-containing polymer compounds such as polytetrafluoroethylene and rubber-based polymer compounds such as styrene butadiene rubber. Fine particles or fine fibers of carbon black, carbon nanotube, or graphite may be compounded as a conductive auxiliary when necessary.

As the current collectors 1, 5, those in which surfaces of copper and aluminum foils are roughened by etching may be used. There are numerous methods for manufacturing an electrode, such as one adding a conductive auxiliary and a binder to activated carbon and then bonding thus formed sheet to the current collector, and one turning activated carbon into a slurry and then applying it to the current collector.

The separator 3 is made of a nonwoven or porous film containing a polyolefin-based resin by a weight ratio of 10% or more, for example. The polarizable electrodes and the separator may be bonded together by applying a pressure to a pair of polarizable electrodes in an environment with a temperature at a softening point of the polyolefin-based resin or higher. Nonwovens made of celluloses and aramid fibers may also be used as the separator.

Known as examples of an electrolytic solution LQ filling the package P are aqueous and organic ones. For organic electrolytic solutions, examples of solvents include propylene carbonate and acetonitrile, while ammonium salts, amine salts, and amidine salts are known as solutes.

As illustrated in FIG. 10, the current collectors 1, 5 of the positive and negative electrodes are joined to the leads A1, K1, respectively. The joining positions may be within the package as illustrated or at the seal part P1. They may be made of integrated metal foils as well. Each of the leads A1, K1 is provided with a processed region 7 having a form into which the resin fits, while unprocessed regions exist in front and rear of the processed region 7 in the longitudinal direction. The leads A1, K1 are inserted into a punching machine having a flat triangular pressing surface and its opposite triangular opening adapted to mate therewith, and are partly punched out with the triangular pressing surface, whereby the processed regions 7 are formed. The seal part P1 and the like are subjected to thermocompression bonding by a press machine.

Figure 11:
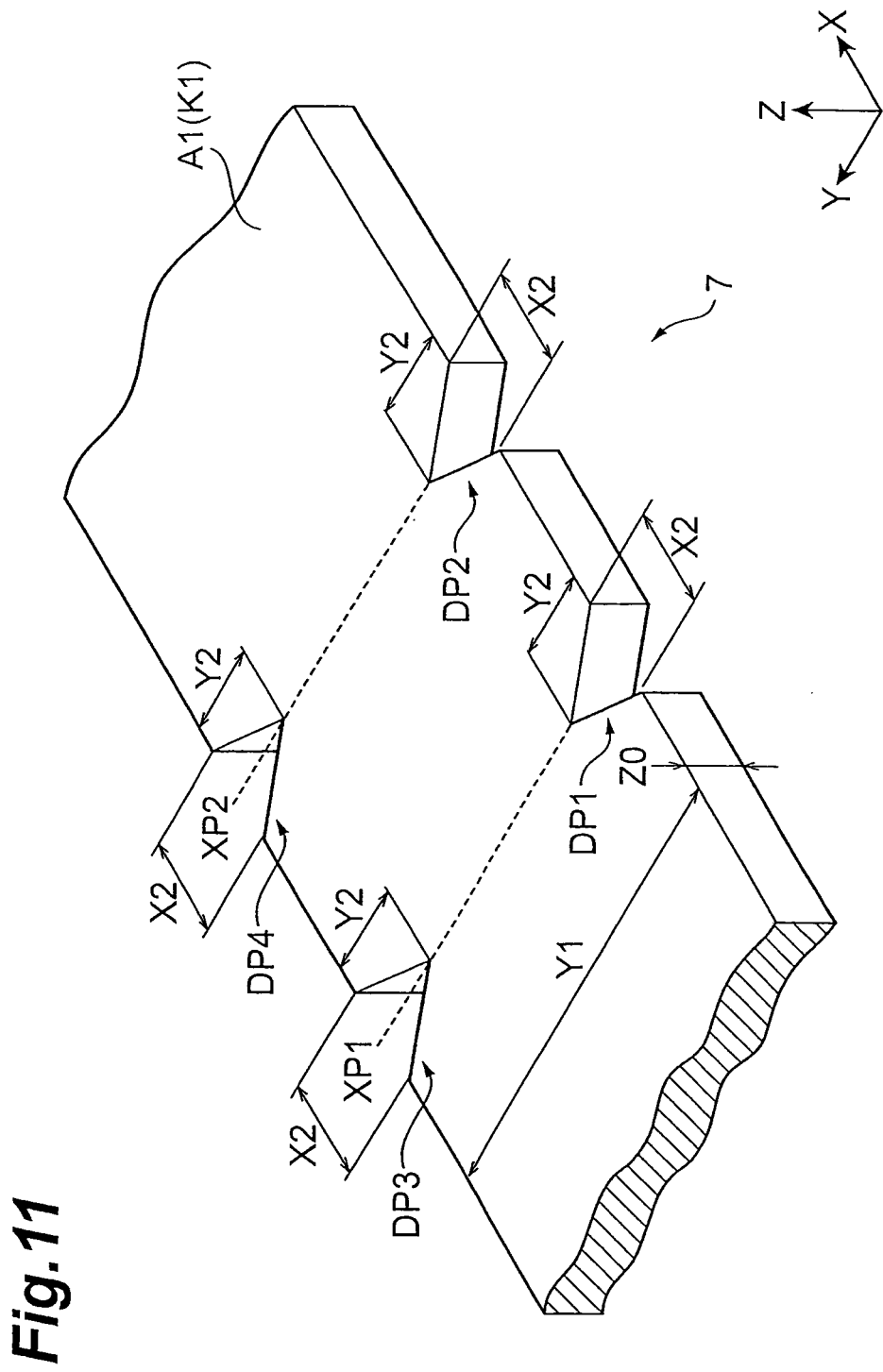
FIG. 11 is an enlarged perspective view of a processed region of a lead.

FIG. 11 is an enlarged perspective view of a processed region of a lead illustrated in FIG. 10.

In the electro-chemical device of this embodiment, each lead A1 (K1) has a plurality of cutouts DP1, DP2 (DP3, DP4) separated from each other along the longitudinal direction (X axis) of the lead A1 (K1) at the seal part P1 (see FIG. 10). Each of the cutouts DP1 to DP4 has a triangular form, in which the length (cutout depth) from a side face of the lead to the apex (deepest part) of the triangle is Y2, while the maximum offset distance of the cutout on the lead side face (base length of the triangle) is X2. In this case, since a plurality of cutouts DP1, DP2 (DP3, DP4) are separated from each other in the longitudinal direction, while the resin of the resin layers bites into each cutout, the lead is firmly buried in the resin layers, whereby the leads are fully inhibited from moving in the longitudinal direction.

The cutouts DP1, DP2 are separated from each other along the X axis. Letting XP1 and XP2 be respective line segments passing the centers of gravity (or apexes) of the cutouts DP1, DP2 while being parallel to the Y axis, the centers of gravity (or apexes) of the remaining cutouts DP3, DP4 are located on the line segments XP1, XP2, respectively. That is, a pair of cutouts DP1, DP3 oppose each other along the lead width direction (Y axis), while a pair of cutouts DP2, DP4 oppose each other along the lead width direction (Y axis).

The size X21 in the X-axis direction of the seal part P1 illustrated in FIG. 10 is set slightly longer than the size X1 in the X-axis direction of the processed region 7 (maximum offset distance in the X-axis direction of the cutout) illustrated in FIG. 11. The resin layers R1, R1 of FIG. 9 extend over the whole area of the seal part P1 in FIG. 10 and thus bite into the cutouts DP1 to DP4 of the processed region 7, thereby restraining the lead A1 (K1) from moving in the X-axis direction. The width Y1 of the lead A1 (K1) is set to 3.5 mm, for example.

Figure 12:
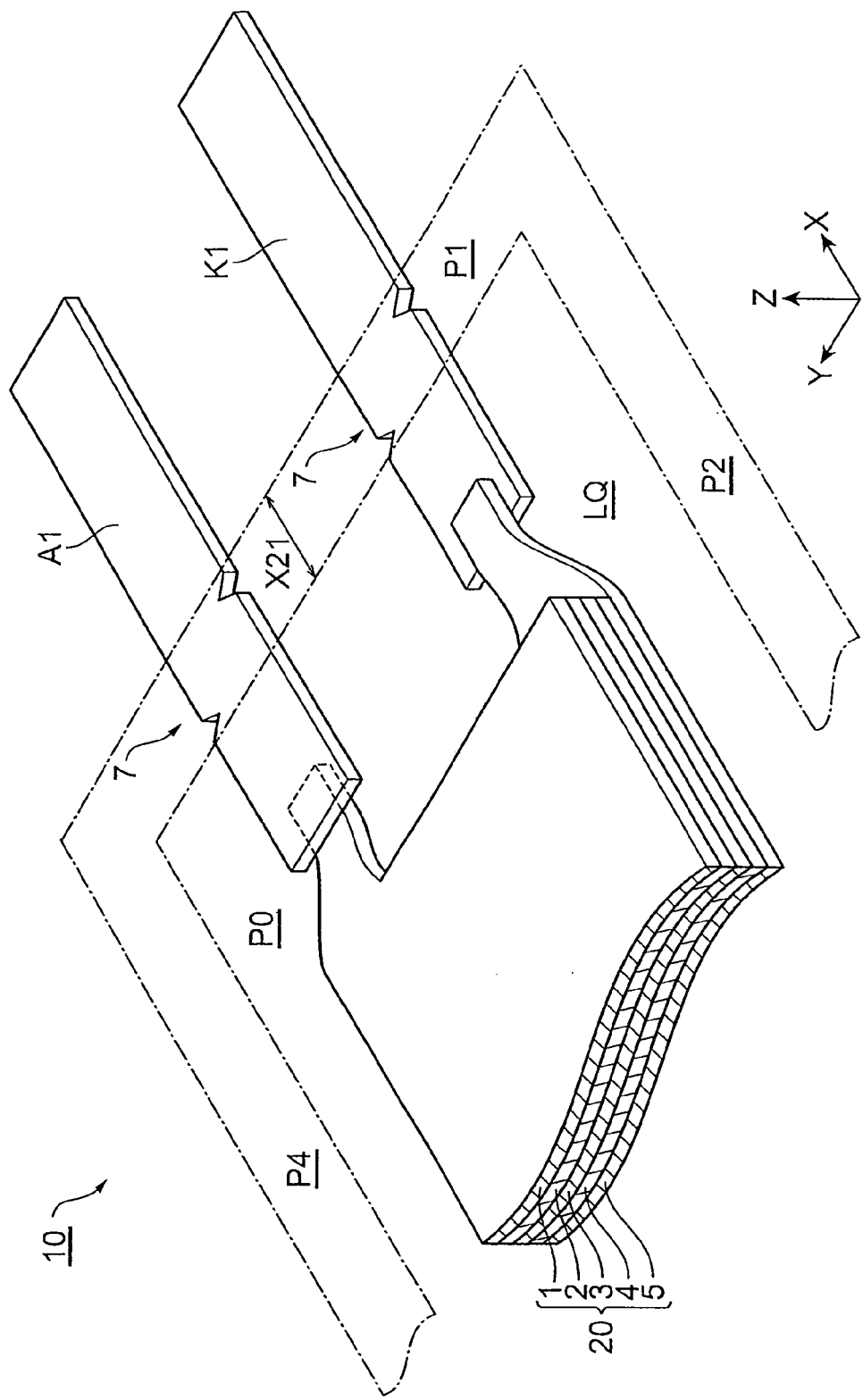
FIG. 12 is an enlarged perspective view of a seal part of an electro-chemical device and its vicinity.
Figure 13:
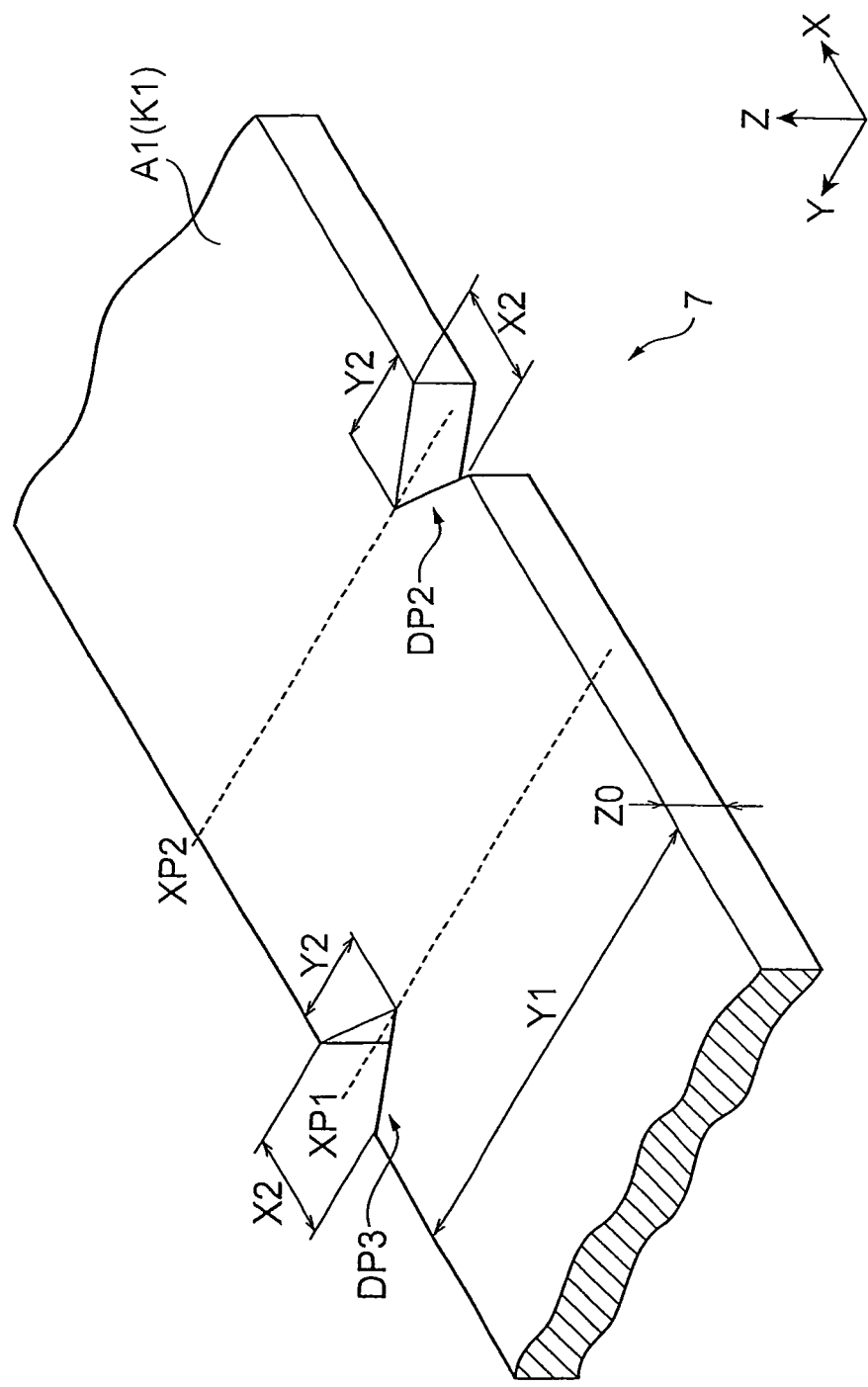
FIG. 13 is an enlarged perspective view of a processed region of a lead.

FIG. 12 is an enlarged perspective view of a seal part of the electro-chemical device in accordance with another embodiment and its vicinity, while FIG. 13 is an enlarged perspective view of a processed region of a lead in accordance with the embodiment illustrated in FIG. 12. The structure of this processed region 7 is the same as that of the embodiment illustrated in FIG. 10 except that the cutouts DP1 and DP4 are omitted from those depicted in FIG. 11. In this structure, a plurality of cutouts DP3, DP2 are disposed on both sides in the width direction of each lead A1 (K1), respectively, while no cutout is located on an extension XP1 (XP2) of one cutout DP3 (DP2) in the width direction of the lead. That is, the cutouts DP3, DP2 are arranged in a staggered manner along the longitudinal direction of the lead (X axis). In this case, the width of the lead provided with the cutouts can be made greater than that in the embodiment of FIG. 10, whereby the lead can be restrained from breaking, while keeping the resistance from increasing.

A method for manufacturing the electro-chemical device in accordance with the embodiment of FIG. 11 or 13 comprises the steps of cutting off at least a plurality of regions located at the seal part P1 (see FIG. 8) of the lead A1 (K1) so as to form the cutouts DP1 to DP4 (DP3, DP2), and arranging the lead A1 (K1) having the cutouts between the resin layers R1, R2 (see FIG. 9) at the seal part P1 and thermocompression-bonding them together with the package. This can manufacture leads inhibited from moving longitudinally and breaking, whereby an electro-chemical device having a high quality can be provided.

Specifically, for example, an A1 foil lead having a width of 3.5 mm, a thickness of 100 μm, and a length of 30 mm is prepared, the processed region 7 is formed by punching or the like within an area smaller than the region to be thermocompression-bonded (having a width of 5 mm), and thereafter a pressure of 0.4 Pa is applied to the upper and lower faces of the lead, so as to remove burrs. The lead is joined to a current collector of the battery element, and then a pressure of $2.94 \times 10^5$ Pa is applied to the seal part, so as to carry out thermocompression bonding for 7 sec at 180° C. Thermocompression-bonding the seal parts P1 to P4 completes the electro-chemical device. Before completing the thermocompression bonding of all the seal parts, the electrolytic solution is introduced into the package.

Figure 14:
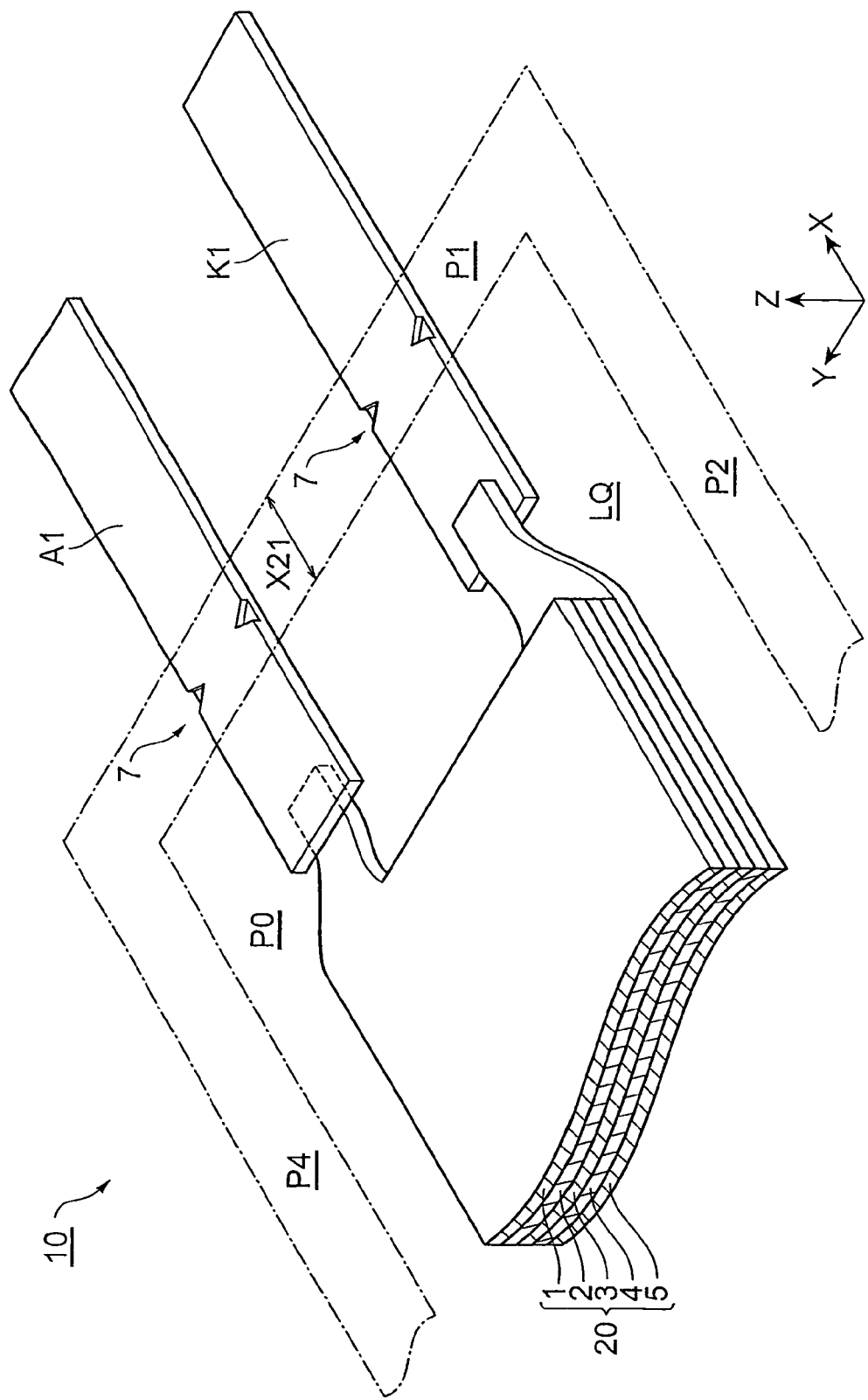
FIG. 14 is an enlarged perspective view of a seal part of an electro-chemical device and its vicinity.
Figure 15:
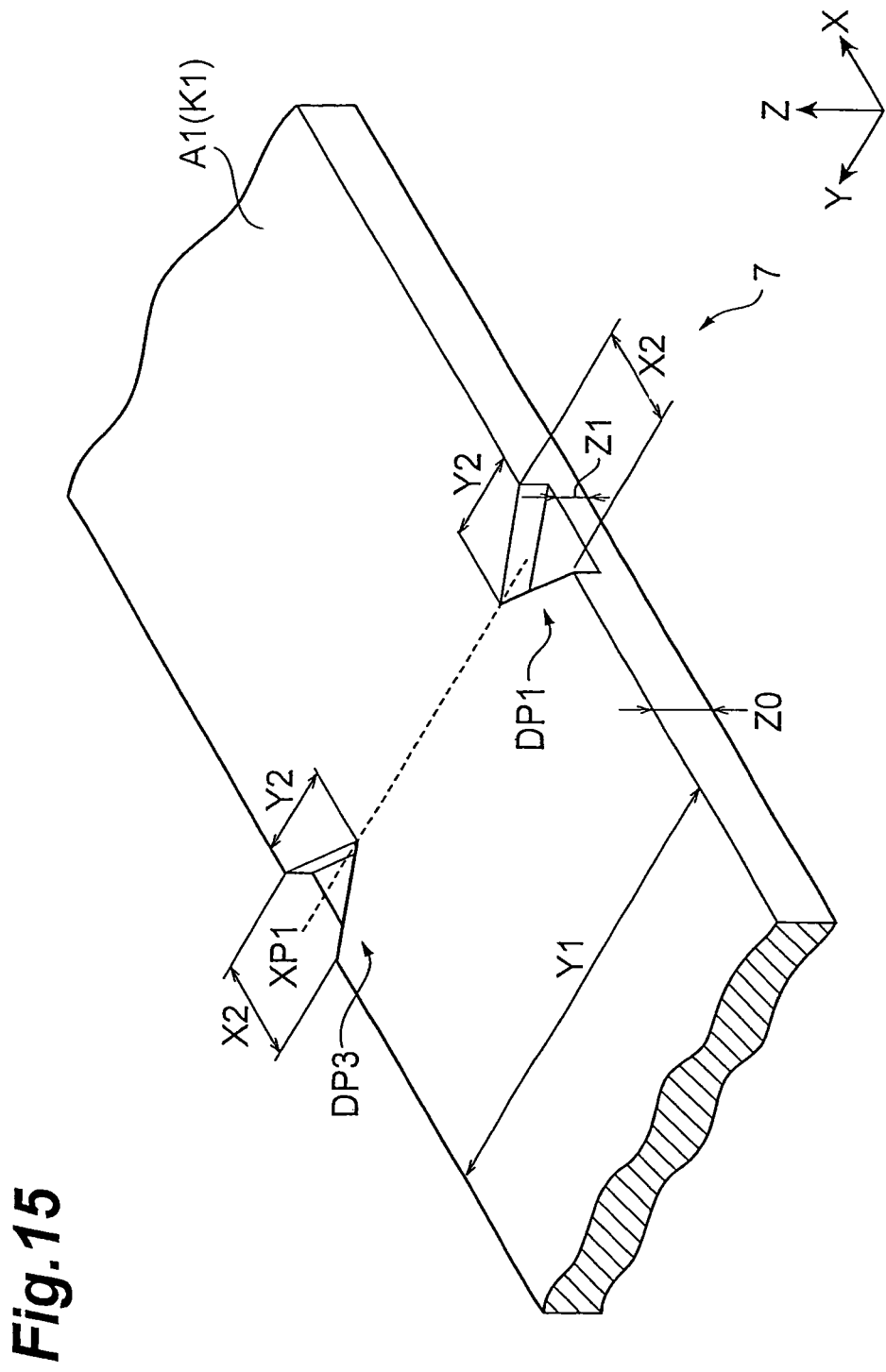
FIG. 15 is an enlarged perspective view of a processed region of a lead.

FIG. 14 is an enlarged perspective view of a seal part of the electro-chemical device in accordance with still another embodiment and its vicinity, while FIG. 15 is an enlarged perspective view of a processed region of a lead in accordance with this embodiment.

In the electro-chemical device of this embodiment, each lead has a plurality of thinned parts DP1, DP3 partly thinned by pressing in its thickness direction at the seal part P1 (see FIG. 8). In this case, since a plurality of thinned parts DP1, DP3 are provided, a difference in level is formed between an unprocessed region and a processed region (thinned part DP1, DP3), so that the resin layers R1, R2 (see FIG. 9) bite into the difference in level, whereby the leads are fully inhibited from moving in the longitudinal direction thereof (X-axis direction). The (thinned part DP1, DP3 are aligned with each other along a line segment XP1 parallel to the Y axis, while having triangular forms with opposing each other.

Letting Z1 be the thickness of each of the thinned parts DP1, DP3, Z1 is smaller than Z0. The remaining structure is the same as that of the embodiment of FIG. 11 mentioned above. Preferably, the thickness Z1 of the lead A1 (K1) and the total thickness Z2 of the resin layers R1, R2 satisfy the relationship of $30\% \leq Z1/Z2 \leq 60\%$. Preferably, the thickness Z1 satisfies $30\ \mu m \leq Z1 \leq 200\ \mu m$. In these cases, breaks tend to occur when the lower limits are not satisfied, while the lead surfaces are harder to be covered naturally when the upper limits are exceeded. That is, the above-mentioned range is effective in covering the lead surfaces effortlessly and keeping a strength against tearing (preventing the leads from breaking) at the time of thermocompression bonding (at 180° C.). For example, the values of Z0 and Z1 are 100 μm and 80 μm, respectively.

A method for manufacturing the electro-chemical device in accordance with the embodiment of FIG. 14 comprises the steps of pressing at least a plurality of regions located at the seal part P1 of the lead A1 (K1) so as to form the thinned parts DP1, DP3, and arranging the lead A1 (K1) having the thinned parts DP1, DP3 between the resin layers R1, R2 at the seal part P1 and thermocompression-bonding them together with the package. The thinned parts DP1, DP3 exhibit a strength higher than that of the cutouts formed by punching and are harder to break. This can manufacture leads inhibited from moving in the longitudinal direction thereof (X axis) and breaking, whereby an electro-chemical device having a high quality can be provided Specifically, for example, an A1 foil lead having a width of 3.5 mm, a thickness of 100 μm, and a length of 30 mm is prepared, the processed region 7 is formed by pressing (e.g., at a pressure of $3.92 \times 10^5$ Pa) within an area smaller than the region to be thermocompression-bonded, and thereafter a pressure of $5.0 \times 10^5$ Pa is applied to the upper and lower faces of the lead, so as to remove buns. The lead is joined to a current collector of the battery element, and then a pressure of $2.94 \times 10^5$ Pa is applied to the seal part, so as to carry out thermocompression bonding for 7 sec at 180° C. Thermocompression-bonding the seal parts P1 to P4 completes the electro-chemical device. Before completing the thermocompression bonding of all the seal parts, the electrolytic solution is introduced into the package.

Figure 16:
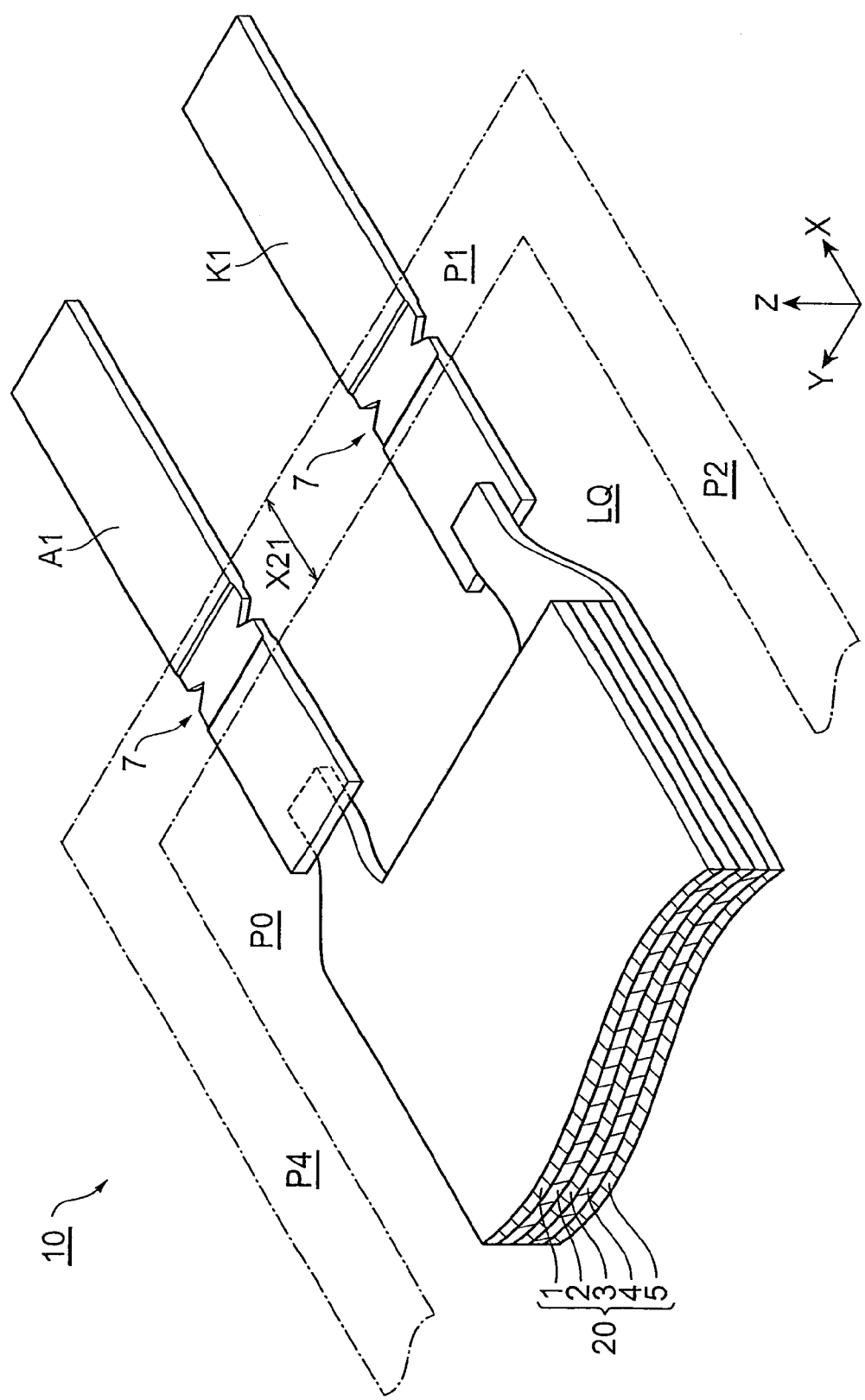
FIG. 16 is an enlarged perspective view of a seal part of an electro-chemical device and its vicinity.
Figure 17:
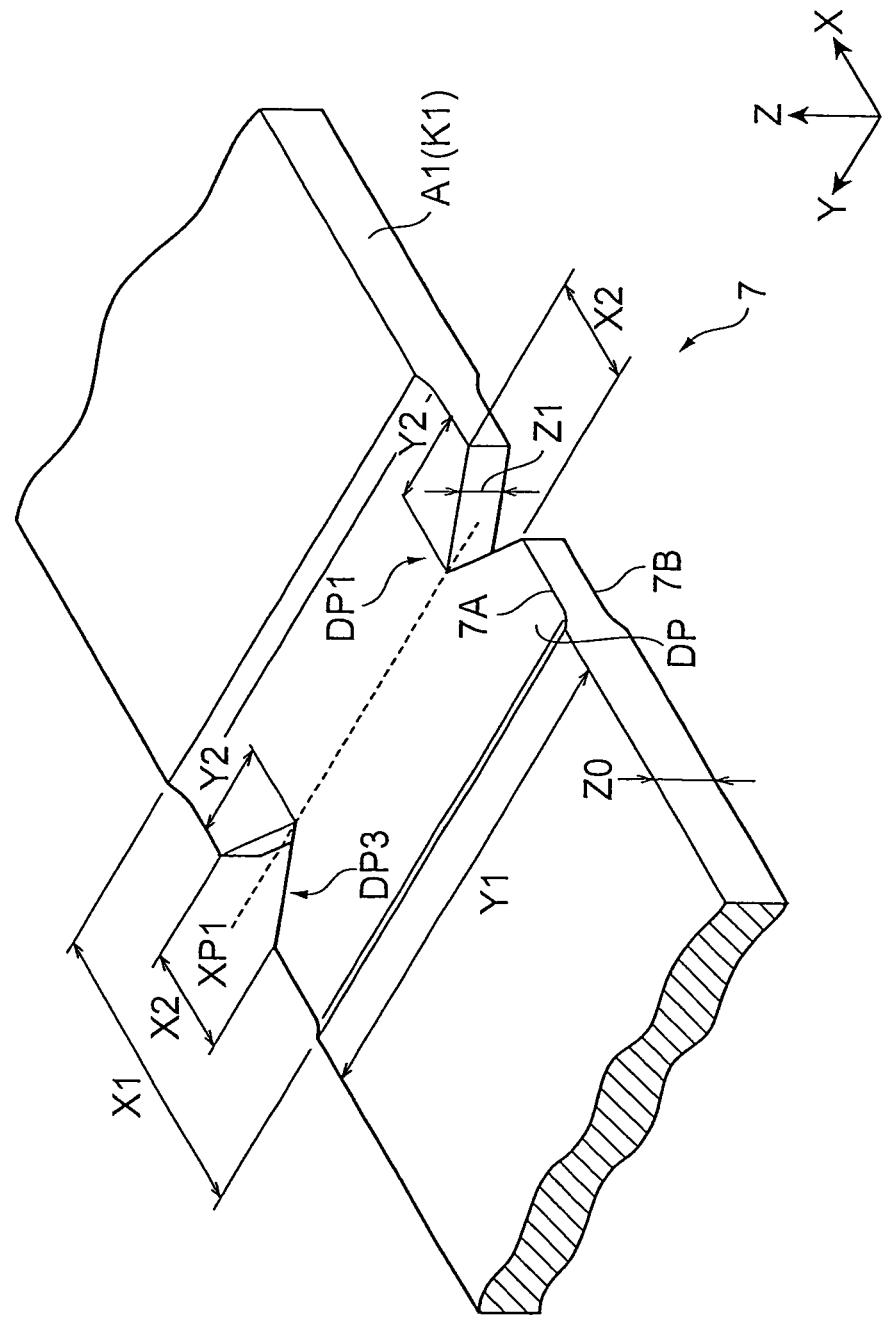
FIG. 17 is an enlarged perspective view of a processed region of a lead.

FIG. 16 is an enlarged perspective view of a seal part of the electro-chemical device in accordance with still another embodiment and its vicinity, while FIG. 17 is an enlarged perspective view of a processed region of a lead in accordance with this embodiment.

In the electro-chemical device of the embodiment illustrated in FIG. 16, each lead A1 (K1) has a band-like thinned part DP (which is a region having a size of X1×Y1 between the upper and lower faces 7A, 7B) thinned by pressing the lead A1 (K1) transversely along the width thereof (by a size X1 in the X-axis direction) at the seal part P1 (see FIG. 8) and cutouts DP1, DP3 provided with the thinned part DP. The thinned part DP is depressed to the inside in the thickness direction of the lead (Z-axis direction), while its portions provided with the cutouts DP1, DP3 are depressed to the inside in the width direction of the lead (Y-axis direction), so that the lead A1 (K1) has an inwardly depressed form throughout a periphery about the longitudinal direction of the lead A1 (K1). The resin of the resin layers R1, R2 (see FIG. 9) biting into these depressions remarkably inhibits the lead from moving in the longitudinal direction thereof. The cutouts DP1, DP3 themselves have the same structure as that in the embodiment of FIG. 11. Preferably, the sizes Z1 and Z0 satisfy their relationship mentioned above. The remaining structure is the same as that in the embodiment of FIG. 11.

A method for manufacturing the electro-chemical device in accordance with the embodiment of FIG. 17 comprises the steps of pressing at least a plurality of regions located at the seal part P1 (see FIG. 8) of the lead A1 (K1) so as to form the band-like thinned part DP, cutting off a partial region from the thinned part DP so as to form the cutouts DP1, DP3, and arranging the lead A1 (K1) having the thinned part DP and cutouts DP1, DP3 between the resin layers R1, R2 (see FIG. 9) at the seal part P1 and thermocompression-bonding them together with the package. This can manufacture leads inhibited from moving longitudinally and breaking, whereby an electro-chemical device having a high quality can be provided.

Specifically, for example, an A1 foil lead having a width of 3.5 mm, a thickness of 100 μm, and a length of 30 mm is prepared, the processed region 7 is formed by the above-mentioned pressing (e.g., at a of $3.92 \times 10^5$ Pa) and subsequent punching for cutouts within an area smaller than the region to be thermocompression-bonded, and thereafter a pressure of $5.0 \times 10^5$ Pa is applied to the upper and lower faces of the lead, so as to remove burrs. The lead is joined to a current collector of the battery element, and then a pressure of $2.94 \times 10^5$ Pa is applied to the seal part, so as to carry out thermo compression bonding for 7 sec at 180° C. Thermocompression-bonding the seal parts P1 to P4 completes the electro-chemical device. Before completing the thermocompression bonding of all the seal parts, the electrolytic solution is introduced into the package, Examples of B-Type Electro-Chemical Devices Characteristics of leads of four embodiments in accordance with FIGS. 11, 13, 15, and 17 were measured as Examples 1 to 4 concerning the B-type electro-chemical devices, respectively. Each initial lead material was an aluminum piece having a width of 3.5 mm, a thickness of 100 μm, and a length of 30 mm, while the pressure and resin material were as exemplified above. The battery element was constituted by an aluminum laminate foil, activated carbon electrodes/aluminum current collector foils, a cellulose separator, and an organic electrolytic solution. The electrolytic solution was a TEMA.$BF_4$ (triethylmethylammonium tetrafluoroborate)/AN (acetonitrile) solution. The ratio of change in the device weight (liquid amount) was measured between before and after a reliability test under the condition of energization at 2.5 V for 1000 hr at 70° C. Comparative Example 1 was one lacking the processed region in the first embodiment of the B-type electro-chemical device illustrated in FIG. 11, while Comparative Example 2 was one in which the thinned parts were penetrated in the third embodiment of the B-type electro-chemical vice illustrated in FIG. 15.

The resistance of the lead was measured by using the four-terminal method at room temperature (25° C.). As the breaking strength of the lead, that of the lead by itself was measured by a tester (tensile/compression tester EZ Test manufactured by Shimadzu Corporation) at room temperature (25° C.). The tensile (pull) strength was measured by the above-mentioned tester (EZ Test) at room temperature (25° C.) with a thermocompression bonding width of 5.0 mm. The final product yield was determined such that products which were chargeable and dischargeable without leakage and short-circuiting after the electrolytic solution injection were taken as good items.

The following are characteristics of the measured leads.

TABLE 3

| | Processed region size(mm) | | Resistance (mΩ) | Breaking strength (N) | Tensile strength (N) | Final product yield (%) | Liquid amount change after reliability test(%) |
|---|---|---|---|---|---|---|---|
| Example 1 | X2 = 0.3 | Y2 = 0.3 | 2.75 | 24.5 | 23.6 | 88 | −4.6 |
| Example 2 | X2 = 0.3 | Y2 = 0.3 | 2.49 | 24.2 | 22.4 | 90 | −5.5 |
| Example 3 | X2 = 0.3 | Y2 = 0.3 | 2.38 | 26.5 | 20.3 | 96 | −5.1 |

TABLE 3-continued

|  | Processed region size(mm) | | Resistance (mΩ) | Breaking strength (N) | Tensile strength (N) | Final product yield (%) | Liquid amount change after reliability test(%) |
|---|---|---|---|---|---|---|---|
| Example 4 | X1 = 2.0 X2 = 0.3 | Y2 = 0.3 | 3.11 | 23.2 | 22.2 | 98 | −2.5 |
| Comparative Example 1 | X2 = 0 | Y2 = 0 | 2.28 | 28.5 | 16.5 | 82 | −35 |
| Comparative Example 2 | X2 = 0.3 | Y2 = 0.3 | 3.43 | 21.8 | 20.8 | 93 | −1.8 |

Letting the evaluation point of Comparative Example 1 in each measurement be 10, respective evaluation points of Comparative Example 2 and Examples 1 to 4 were calculated relative thereto. They were scored as performance indexes. The following lists the results.

TABLE 4

|  | Resistance | Breaking strength | Tensile strength | Final product yield | Weight change ratio (leakage) | Total |
|---|---|---|---|---|---|---|
| Example 1 | 8.29 | 8.60 | 14.30 | 10.73 | 14.68 | 56.6 |
| Example 2 | 9.14 | 8.49 | 13.58 | 10.98 | 14.54 | 56.7 |
| Example 3 | 9.57 | 9.30 | 12.30 | 11.71 | 14.60 | 57.5 |
| Example 4 | 7.31 | 8.14 | 13.45 | 11.95 | 15.00 | 55.9 |
| Comparative Example 1 | 10.00 | 10.00 | 10.00 | 10.00 | 10.00 | 50.0 |
| Comparative Example 2 | 6.63 | 7.65 | 12.61 | 11.34 | 15.11 | 53.3 |

As mentioned above, the leads of the examples slightly increased their resistance as their cross-sectional areas decreased, but remarkably improved their reliability by enhancing their pull strength. From this viewpoint, it has been found that the electro-chemical devices in accordance with Examples 1 to 4 are much better than those of Comparative Examples 1 and 2. Though two-dimensional forms of the above-mentioned thinned parts and cutouts DP1 to DP4 are preferably polygonal, e.g., triangular, they may be in other forms as well in the case of a triangular form, the angle at the apex located at the deepest part preferably ranges from 60° to 150° within the XY plane from the viewpoint of securing a tear strength (since an acuter angle makes them easier to tear).

The C-type electro-chemical device will now be explained.

Figure 18:
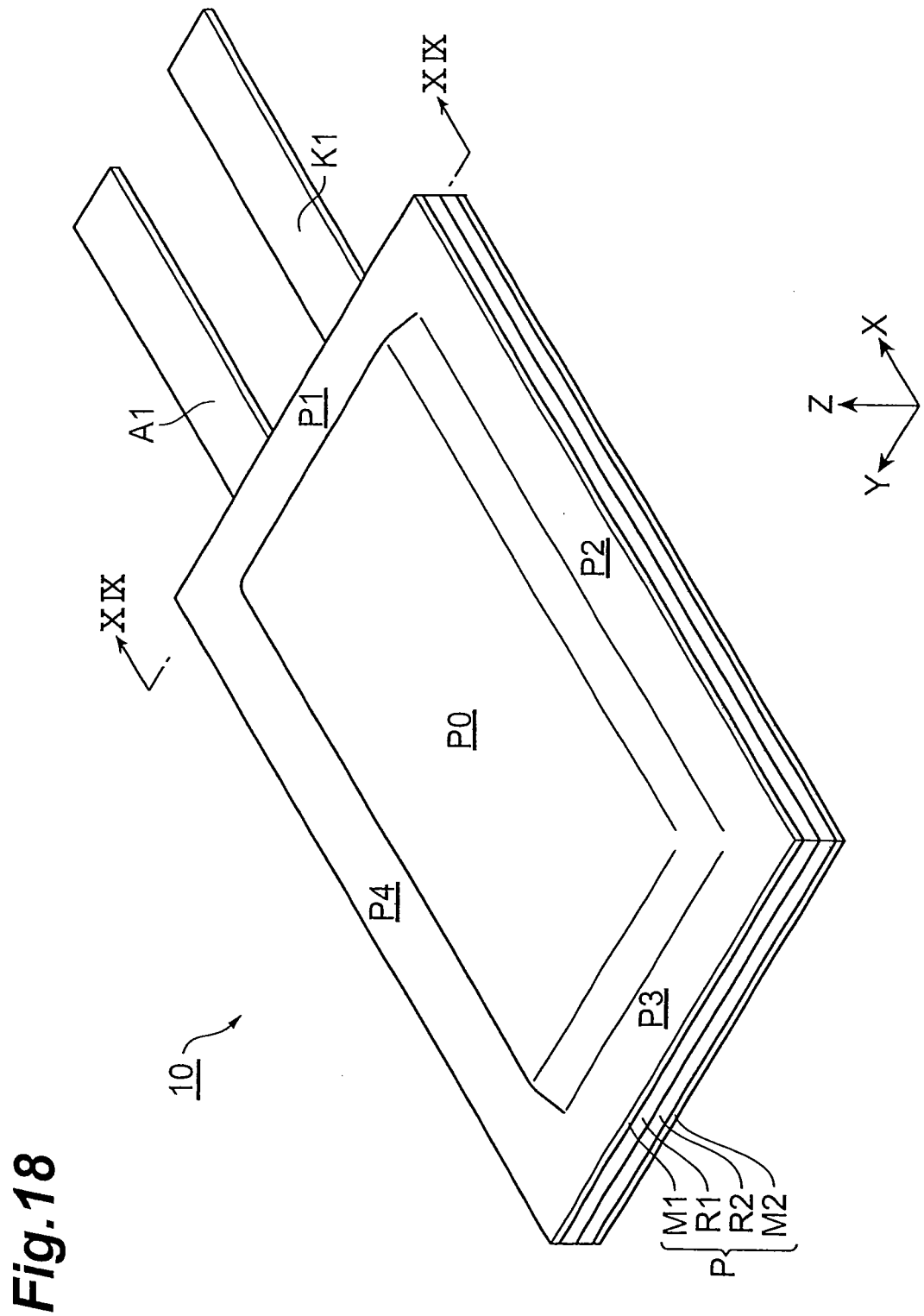
FIG. 18 is a perspective view of an electro-chemical device.
Figure 19:
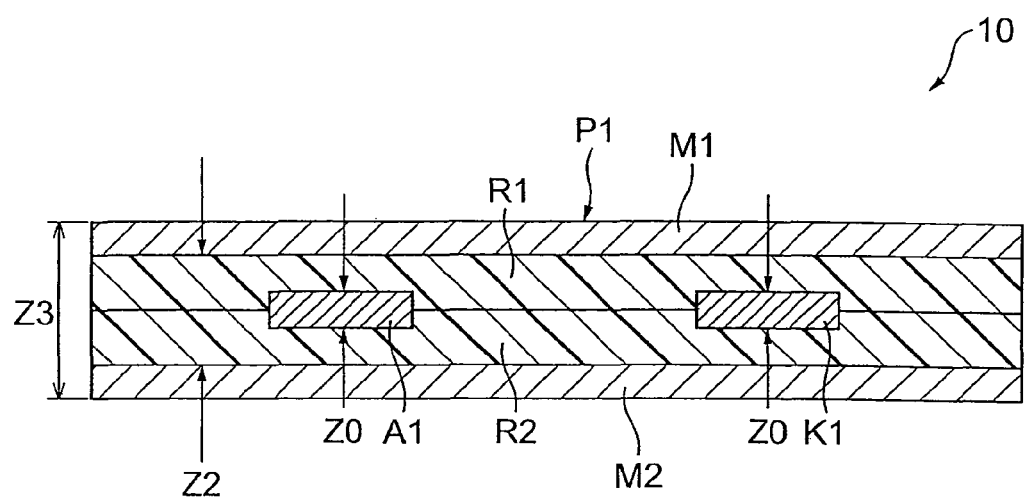
FIG. 19 is a sectional view of the electro-chemical device taken along the line XIX-XIX of FIG. 18.
Figure 20:
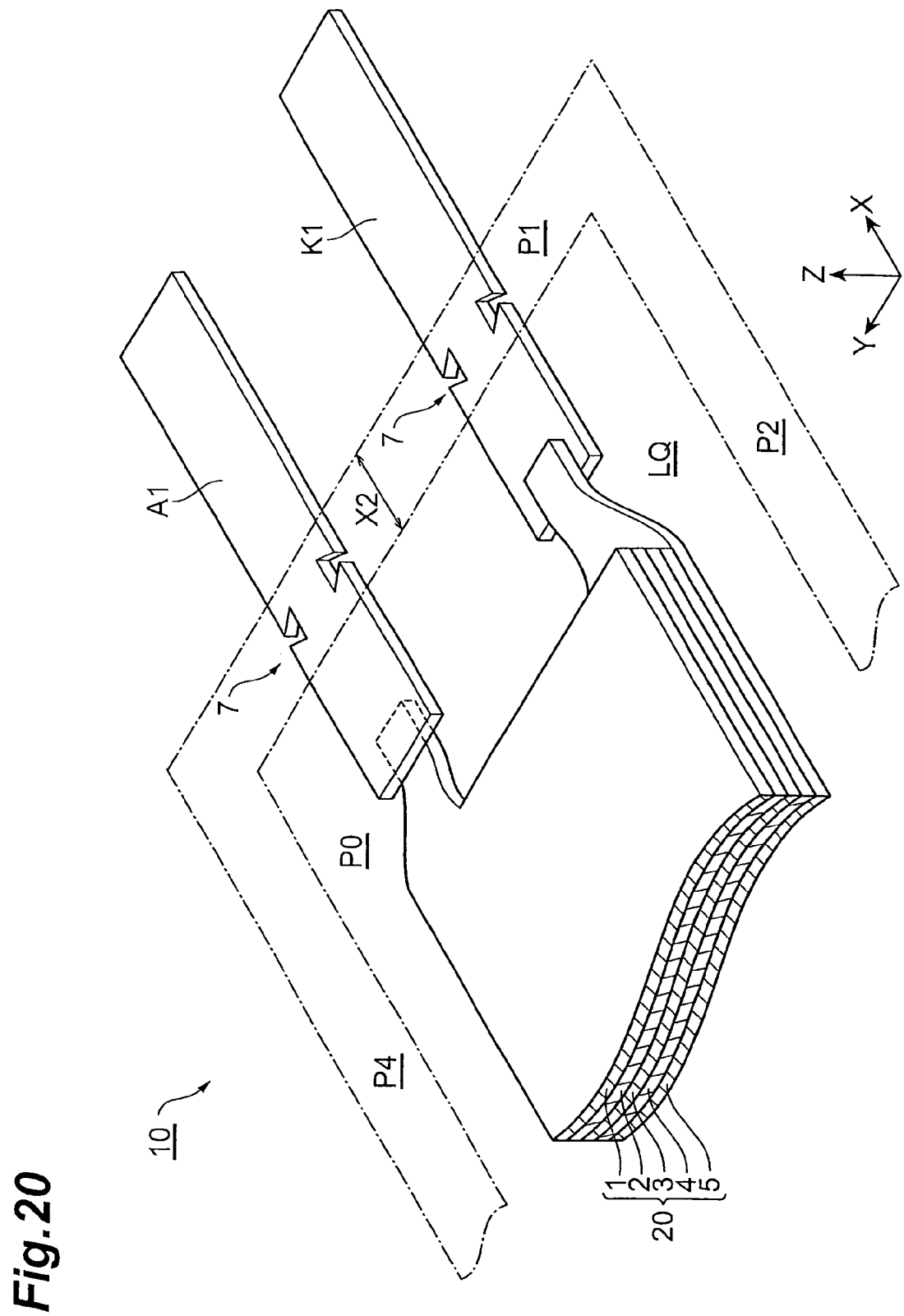
FIG. 20 is an enlarged perspective view of a seal part of the electro-chemical device in accordance with an embodiment and its vicinity.

FIG. 18 is a perspective view of a C-type electro-chemical device. FIG. 19 is a sectional view of the electro-chemical device taken along the line XIX-XIX of FIG. 18. FIG. 20 is an enlarged perspective view of a seal part of the electro-chemical device in accordance with an embodiment and its vicinity, in these drawings, an XYZ three-dimensional orthogonal coordinate system is set as illustrated.

This electro-chemical device is an electric double-layer capacitor (EDLC) comprising a package P including metal films M1, M2, a battery element 20 (see FIG. 20) sealed within the package P, resin layers R1, R2 disposed at least on the inside of a seal part (top seal part) P1 of the package P, and leads A1, K1 extending from the battery element 20 to the outside of the package P through between the resin layers R1, R2 at the seal part P1 of the package P. The leads A1, K1 extend along the X axis, while their width and thickness directions coincide with the Y and Z axes, respectively. The resin layers R1, R2 are made of polymer films constituted by polypropylene or the like.

The resin layers R1, R2 are attached to the whole inner faces of the metal films M1, M2, respectively, but may be disposed at only the seal parts P1, P2, P3, P4 in peripheries of the four sides of the rectangular package P on the metal films M1, M2. The seal parts P1, P2, P3, P4 are sealed by thermocompression bonding. The battery element 20 is arranged within a center region P0 surrounded by the seal parts P1, P2, P3, P4 at the four sides of the package P. A voltage can be applied between the lead A1 acting as an anode and the lead K1 acting as a cathode, so as to charge the battery element 20, and the power charged in the battery element 20 can be taken out from the leads.

Referring to FIG. 19, let Z0, Z2, and Z3 be the thickness of die lead A1 (K1) at the seal part P1 (which becomes Z1 when the seal part is pressed), total thickness of the resin layers R1, R2, and total thickness of the package, respectively.

Numerous structures can be considered for the battery element 20 illustrated in FIG. 20. As an electrode on the anode (positive electrode) side, one combining a current collector 1 made of a foil of a metal such as aluminum or copper and a polarizable electrode 2 made of an activated carbonaceous structure or the like together is used in this example. As an electrode on the cathode (negative electrode) side, one combining a current collector 5 made of a foil of a metal such as aluminum and a polarizable electrode 4 made of an activated carbonaceous structure or the like together is used. A separator 3 is disposed between the positive and negative electrodes. While a plurality of battery elements may be laminated as a matter of course, an example accommodating only one battery element is illustrated here for simplicity.

Each of the polarizable electrodes 2, 4 is made of a porous material, which is manufactured by mixing a binder resin with activated carbon. Examples of the binder resin include fluorine-containing polymer compounds such as polytetrafluoroethylene and rubber-based polymer compounds such as styrene butadiene rubber. Fine particles or fine fibers of carbon black, carbon nanotube, or graphite may be compounded as a conductive auxiliary when necessary.

As the current collectors 1, 5, those in which surfaces of copper and aluminum foils are roughened by etching may be used. There are numerous methods for manufacturing an electrode, such as one adding a conductive auxiliary and a binder to activated carbon and then bonding thus formed sheet to the current collector, and one turning activated carbon into a slurry and then applying it to the current collector.

The separator 3 is made of a nonwoven or porous film containing a polyolefin-based resin by a weight ratio of 10% or more, for example. The polarizable electrodes and the separator may be bonded together by applying a pressure to a pair of polarizable electrodes in an environment with a temperature at a softening point of the polyolefin-based resin or higher. Nonwovens made of celluloses and aramid fibers may also be used as the separator.

Known as examples of an electrolytic solution LQ filling the package P are aqueous and organic ones. Far organic electrolytic solutions, examples of solvents include propylene carbonate and acetonitrile, while ammonium salts, amine salts, and amidine salts are known as solutes.

As illustrated in FIG. 20, the current collectors 1, 5 of the positive and negative electrodes are joined to the leads A1, K1, respectively. The joining positions may be within the package as illustrated or at the seal part P1. They may be made of integrated metal foils as well. Each of the leads A1, K1 is provided with a processed region 7 having a form into which the resin fits, while unprocessed regions exist in front and rear of the processed region 7 in longitudinal direction. The leads A1, K1 are inserted into a punching machine having a flat triangular pressing surface and its opposite triangular opening adapted to mate therewith, and are partly punched out with the triangular pressing surface, whereby the processed regions 7 are formed. The seal part P1 and the like are subjected to thermocompression bonding by a press machine.

Figure 21:
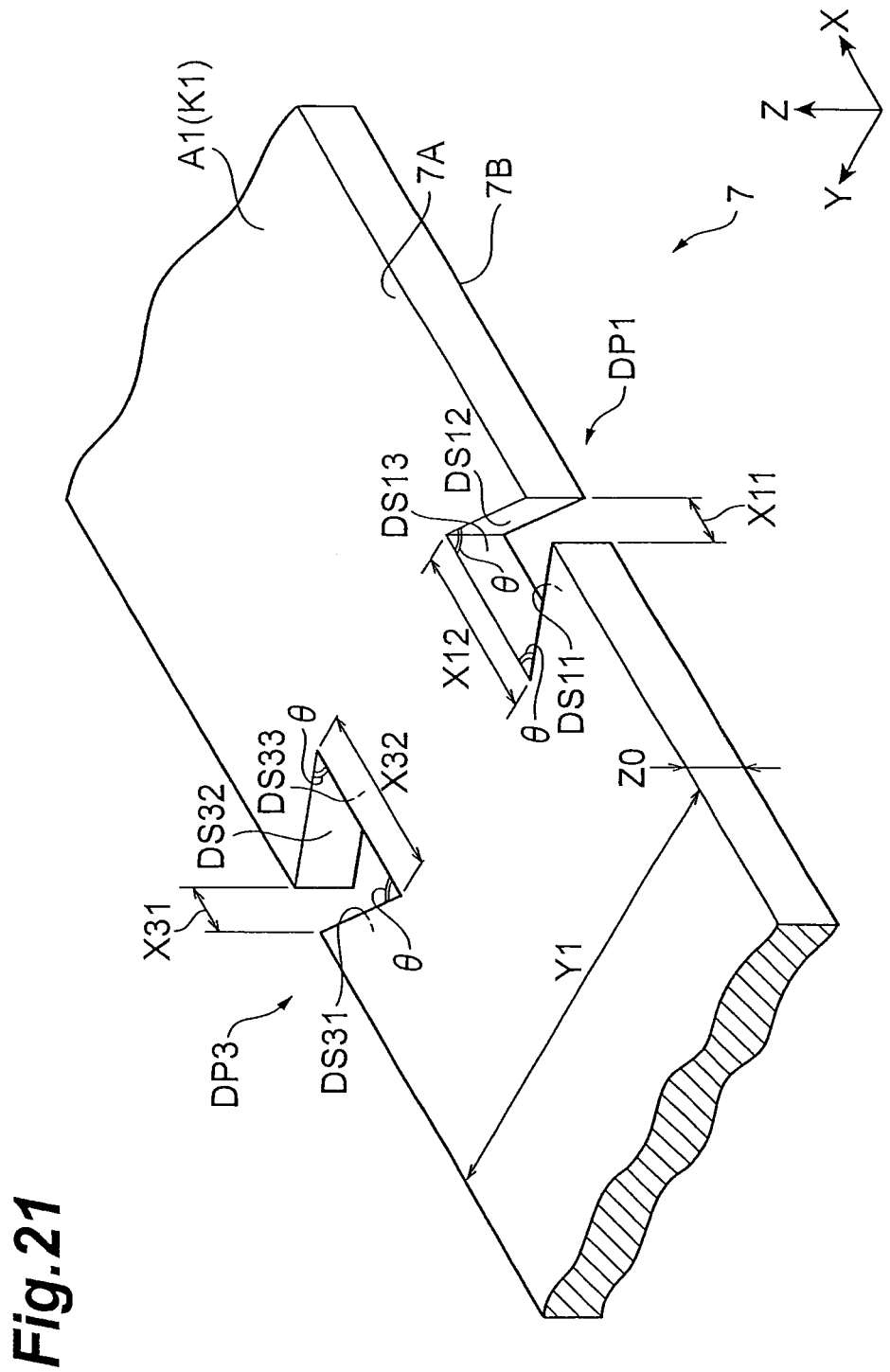
FIG. 21 is an enlarged perspective view of a processed region of a lead in accordance with the above-mentioned embodiment.

FIG. 21 is an enlarged perspective view of a processed region of a lead in accordance with the embodiment of the C type.

In the electro-chemical device of this embodiment, each lead A1 (K1) has a plurality of cutouts DP1, DP3 at the seal part P1 (see FIG. 20). The cutouts DP1, DP3, each of which is shaped like a triangle having one apex on the outside of the lead, are arranged such that the respective bases of the triangles oppose each other. Letting 7A and 7B be the upper and lower faces of the processed region 7 of the lead A1 (K1), the side faces on both sides in the width direction of the lead A1 (K1) are located between the upper and lower faces 7A, 7B.

The opening sizes X11, X31 in the longitudinal direction (X axis) of the lead A1 (K1) of the cutouts DP1, DP3 in the side faces on both sides in the width direction (Y axis) of the lead are smaller than the opening sizes X12, X32 in the longitudinal direction (X axis) of the lead A1 (K1) of the cutouts DP1, DP3 at positions inside of the side faces on both sides in the width direction (Y axis) of the lead, respectively.

In this case, the resin of the resin layers R1, R2 (see FIG. 19) bites into the cutouts DP1, DP3, whereby the lead A1 (K1) is firmly buried in the resin layers R1, R2. Since the opening sizes X11, X31 in the side faces of the lead are smaller than the opening sizes X12, X32 on the inside, the resin within the cutouts DP1, DP3 is less likely to flow out. That is, the relative relationship between the cutouts DP1, DP3 and the resin layers R1, R2 is secured more firmly.

This fully inhibits the lead from moving along the X axis. The forms of the cutouts DP1, DP3 are also such that surfaces DS11, DS12, DS31, DS33 on the inside of the opening restrain the lead from moving in its width direction (Y axis) relative to the resin. That is, the cutouts DP1, DP3 each have three inner side faces (DS11, DS12, DS13; DS31, DS32, DS33) surrounding the Z axis. When seen on a plane (viewed from the Z axis), the inner side faces D13, D33 in the deepest parts corresponding to the bases of the triangles are parallel to the XZ plane, while the remaining inner side faces DS11, DS12, DS31, DS32 intersect DS13, DS33 at an acute angle (θ).

When the cutouts DP1, DP3 are triangular as mentioned above, each of the angles at two apexes on the base of each opening seen as a plane, i.e., the angle (acute angle θ) formed between the inner side face DS13 (DS33) and the inner side face DS11 or DS12 (DS31 or DS32), preferably ranges from 30° to 90° from the viewpoint of fully securing the pull strength.

The resin within one cutout DP1 abuts against the inner side faces DS11, DS12, so as to keep the lead A1 (K1) from moving in the positive direction of the Y axis, and comes into contact with the inner side face DS13, so as to keep the lead A1 (K1) from moving in the negative direction of the Y axis. Similarly, the resin within another cutout DP3 abuts against the inner side faces DS31, DS32, so as to keep the lead A1 (K1) from moving in the negative direction of the Y axis, and comes into contact with the inner side face DS33, so as to keep the lead A1 (K1) from moving in the positive direction of the Y axis. These movement restricting forces keep their balance since the forms of the cutouts DP1, DP3 are mirror-symmetrical to each other with respect to the XZ plane passing the center of the lead, whereby the force for restricting the movement along the Y axis becomes very high.

This inhibits the leads from moving and prevents liquids from leaking and so forth, whereby an electro-chemical device having a high quality can be provided.

The size X2 in the X-axis direction of the seal part P1 illustrated in FIG. 20 is set slightly longer than the size in the X-axis direction of the processed region 7 (maximum offset distance (X12 (X32)) in the X-axis direction of the cutout) illustrated in FIG. 21. The resin layers R1, R1 of FIG. 19 extend over the whole area of the seal part P1 in FIG. 20 and thus bite into the cutouts DP1, DP3 of the processed region 7, thereby restraining the lead A1 (K1) from moving in the X- and Y-axis directions. The width Y1 of the lead A1 (K1) is set to 3.5 mm, for example.

A method for manufacturing the electro-chemical device in accordance with this embodiment comprises the steps of cutting off at least a region located at the seal part P1 (see FIG. 18) of the lead A1 (K1) so as to form the cutouts DP1, DP3, and arranging the lead A1 (K1) having the cutouts DP1, DP3 between the resin layers R1, R2 (see FIG. 19) at the seal part P1 and thermocompression-bonding them together with the package. This can manufacture leads inhibited from moving in the X- and Y-axis directions thereof and breaking, whereby an electro-chemical device having a high quality can be provided. The number of cutouts may also be 3 or more per lead.

Specifically, for example, an A1 foil lead having a width of 3.5 mm, a thickness of 100 μm, and a length of 30 mm is prepared, the processed region 7 is formed by punching or the like within an area smaller than the region to be thermocompression-bonded, and thereafter a pressure of $4.0 \times 10^5$ Pa is applied to the upper and lower faces of the lead, so as to remove burrs. The lead is joined to a current collector of the battery element, and then a pressure of $2.94 \times 10^5$ Pa is applied to the seal part, so as to carry out thermocompression bonding for 7 see at 180° C. Thermocompression-bonding the seal parts P1 to P4 completes the electro-chemical device. Before completing the thermocompression bonding of all the seal parts, the electrolytic solution is introduced into the package.

Example of C-Type Electro-Chemical Device

Characteristics of leads in accordance with this embodiment were measured as Example 1 of the C-type electro-chemical device. Each initial lead material was an aluminum piece having a width of 3.5 mm, a thickness of 100 μm, and a length of 30 mm, while the pressure and resin material were as exemplified above. The battery element was constituted by an aluminum laminate foil, activated carbon electrodes/aluminum current collector foils, a cellulose separator, and an organic electrolytic solution. The electrolytic solution TEMA.BF$_4$ (triethylmethylammonium tetrafluoroborate)/AN (acetonitrile) solution. The ratio of change in the liquid amount was measured between before and after a reliability test under the condition of energization, at 2.5 V for 1000 hr at 70° C. Comparative Example 1 was one lacking the processed region in Example 1, while Comparative Example 2 was one in which each of the cutouts had a semicircular form with a radius of 0.15 mm.

The resistance of the lead was measured by using the four-terminal method at room temperature (25° C.). As the breaking strength of the lead, that of the lead by itself was measured by a tester (tensile/compression tester EZ Test manufactured by Shimadzu Corporation) at room temperature (25° C.). The tensile (pull) strength was measured by the above-mentioned tester (EZ Test) at room temperature (25° C.) with a thermocompression bonding width of 5.0 mm. The final product yield was determined such that products which were chargeable and dischargeable without leakage and short-circuiting after the electrolytic solution injection were taken as good items.

The following are characteristics of the measured leads.

TABLE 5

| | Processed region size (mm) | Resistance (mΩ) | Breaking strength (N) | Tensile strength (N) | Final product yield (%) | Liquid amount change after reliability test (%) |
|---|---|---|---|---|---|---|
| Example 1 | X11 = 0.1<br>X12 = 0.3<br>X31 = 0.1<br>X32 = 0.3<br>acute angle(θ) = 60° | 2.53 | 25.6 | 25.6 | 96 | −2.1 |
| Comparative Example 1 | — | 2.28 | 28.5 | 16.5 | 82 | −35 |
| Comparative Example 2 | semicircular with radius of 0.15 mm | 2.49 | 26.4 | 18.5 | 87 | −27.0 |

Letting the evaluation point of Comparative Example 1 in each measurement be 10, respective evaluation points of Comparative Example 2 and Example 1 were calculated relative thereto. They were scored as performance indexes. The following lists the results.

TABLE 6

| | Resistance | Breaking strength | Tensile strength | Final product yield | Weight change ratio (leakage) | Total |
|---|---|---|---|---|---|---|
| Example 1 | 9.00 | 8.98 | 15.52 | 11.71 | 15.06 | 60.3 |
| Comparative Example 1 | 10.00 | 10.00 | 10.00 | 10.00 | 10.00 | 50.0 |
| Comparative Example 2 | 9.14 | 9.26 | 11.21 | 10.61 | 11.23 | 51.46 |

As mentioned above, the electro-chemical device in accordance with Example 1 slightly increased its resistance as its cross-sectional area decreased, but remarkably improved its reliability by enhancing the pull strength. From this viewpoint, it has been found that the electro-chemical device in accordance with Example 1 is much better than those of Comparative Examples 1 and 2 in terms of experiments as well. Though two-dimensional forms of the above-mentioned cutouts DP1, DP3 are preferably polygonal, e.g., triangular, they may be in other forms as well.

The D-type electro-chemical device will now be explained.

Figure 22:
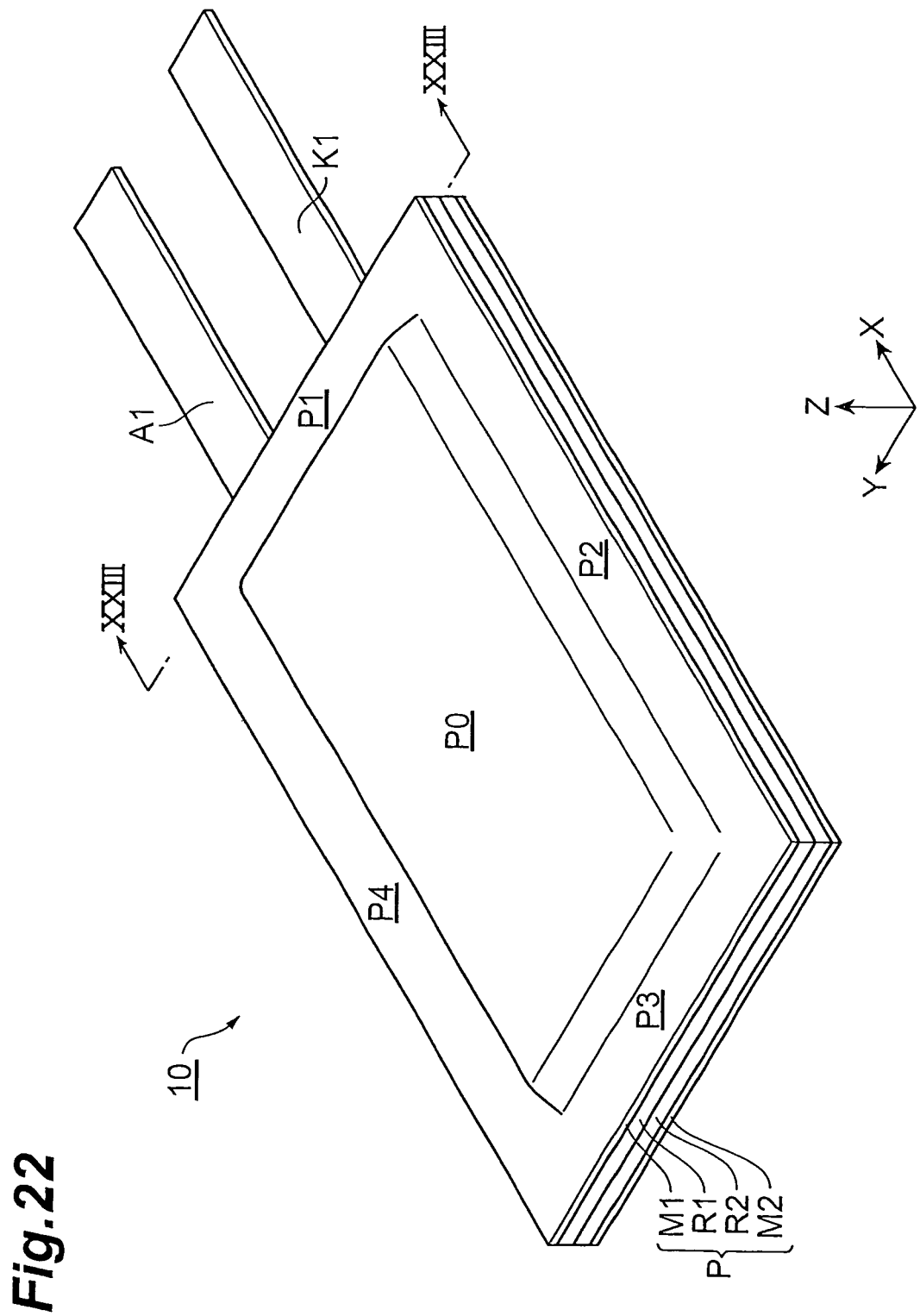
FIG. 22 is a perspective view of an electro-chemical device.
Figure 24:
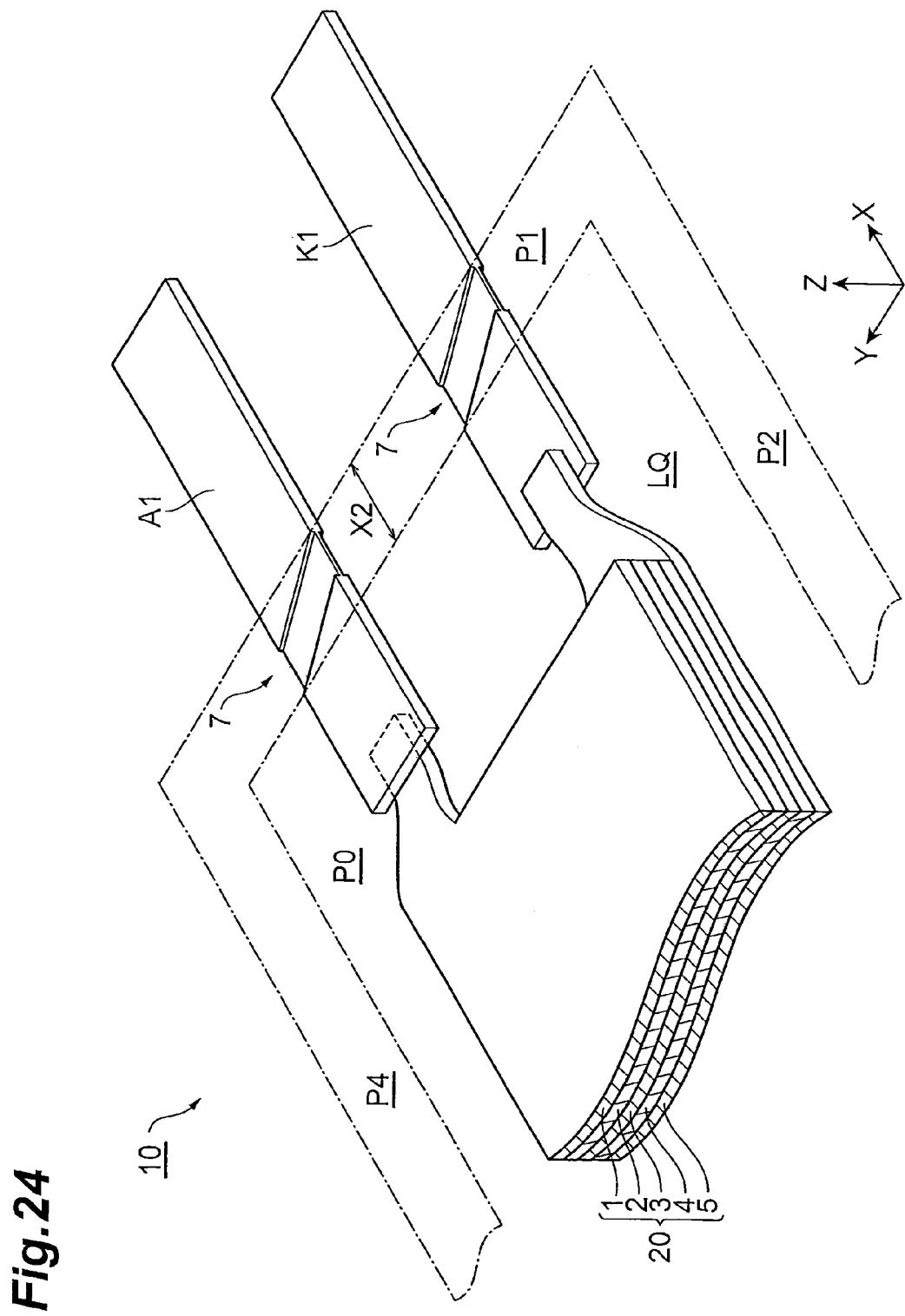
FIG. 24 is an enlarged perspective view of a seal part of the electro-chemical device in accordance with an embodiment and its vicinity.

FIG. 22 is a perspective view of a D-type electro-chemical device. FIG. 23 is a sectional view of the electro-chemical device taken along the line XXIII-XXIII of FIG. 22. FIG. 24 is an enlarged perspective view of a seal part of the electro-chemical device in accordance with an embodiment and its vicinity. In these drawings, an XYZ three-dimensional orthogonal coordinate system is set as illustrated.

This electro-chemical device is an electric double-layer capacitor (EDLC) comprising a package P including metal films M1, M2, a battery element 20 (see FIG. 24) sealed within the package P, resin layers R1, R2 disposed at least on the inside of a seal part (top seal part) P1 of the package P, and leads A1, K1 extending from the battery element 20 to the outside of the package P through between the resin layers. R1 R2 at the seal part P1 of the package P. The leads A1, K1 extend along the X axis, while their width and thickness directions coincide with the Y and Z axes, respectively. The resin layers R1, R2 are made of polymer films constituted by polypropylene or the like.

The resin layers R1, R2 are attached to the whole inner faces of the metal films M1, M2, respectively, but may be disposed at only the seal parts P1, P2, P3, P4 in peripheries of the four sides of the rectangular package P on the metal films M1, M2. The seal parts P1, P2, P3, P4 are sealed by thermocompression bonding. The battery element 20 is arranged within a center region P0 surrounded by the seal parts P1, P2, P3, P4 at the four sides of the package P. A voltage can be applied between the lead A1 acting as an anode and the lead K1 acting as a cathode, so as to charge the battery element 20, and the power charged in the battery element 20 can be taken out from the leads.

Referring to FIG. 23, let Z1 and Z0 be the thickness of the lead A1 (K1) at the seal part P1 and its thickness before sealing, respectively. Let Z2 and Z3 be the total thickness of the resin layers R1, R2 and total thickness of the package, respectively.

Numerous structures can be considered for the battery element 20 illustrated in FIG. 24. As an electrode on the anode (positive electrode) side, one combining a current collector 1 made of a foil of a metal such as copper and a polarizable electrode 2 made of an activated carbonaceous structure or the like together is used in this example. As an electrode on the cathode (negative electrode) side, one combining a current collector 5 made of a foil of a metal such as aluminum and a polarizable electrode 4 made of an activated carbonaceous structure or the like together is used. A separator 3 is disposed between the positive and negative electrodes. While a plurality of battery elements may be laminated as a matter of course, an example accommodating only one battery element is illustrated here for simplicity.

Each of the polarizable electrodes 2, 4 is made of a porous material, which is manufactured by mixing a binder resin with activated carbon. Examples of the binder resin include fluorine-containing polymer compounds such as polytetrafluoroethylene and rubber-based polymer compounds such as styrene butadiene rubber. Fine particles or fine fibers of carbon black, carbon nanotube, or graphite may be compounded as a conductive auxiliary when necessary.

As the current collectors 1, 5, those in which surfaces of copper and aluminum foils are roughened by etching may be used. There are numerous methods for manufacturing an electrode, such as one adding a conductive auxiliary and a binder to activated carbon and then bonding thus formed sheet to the current collector, and one turning activated carbon into a slurry and then applying it to the current collector.

The separator 3 is made of a nonwoven or porous film containing a polyolefin-based resin by a weight ratio of 10% or more, for example. The polarizable electrodes and the separator may be bonded together by applying a pressure to a pair of polarizable electrodes in an environment with a temperature at a softening point of the polyolefin-based resin or higher. Nonwovens made of celluloses and aramid fibers may also be used as the separator.

Known as examples of an electrolytic solution LQ filling the package P are aqueous and organic ones. For organic electrolytic solutions, examples of solvents include propylene carbonate and acetonitrile, while ammonium salts, amine salts, and amidine salts are known as solutes.

As illustrated in FIG. 24, the current collectors 1, 5 of the positive and negative electrodes are joined to the leads A1, K1, respectively. The joining positions may be within the package as illustrated or at the seal part P1. They may be made of integrated metal foils as well. Each of the leads A1, K1 is provided with a processed region 7 having a form into which the resin fits, while unprocessed regions exist in front and rear of the processed region 7 in the longitudinal direction.

The processed region 7 is constituted by grooves DP1, DP2 each having a flat bottom face and extending obliquely with respect to the width direction of the leads. The leads A1, K1 are inserted into a press machine having a pair of flat pressing surfaces extending obliquely and pressed with the pressing surfaces, whereby the processed regions 7 are formed. Thereafter, the seal part P1 and the like are subjected to thermocompression bonding by a press machine.

Figure 25:
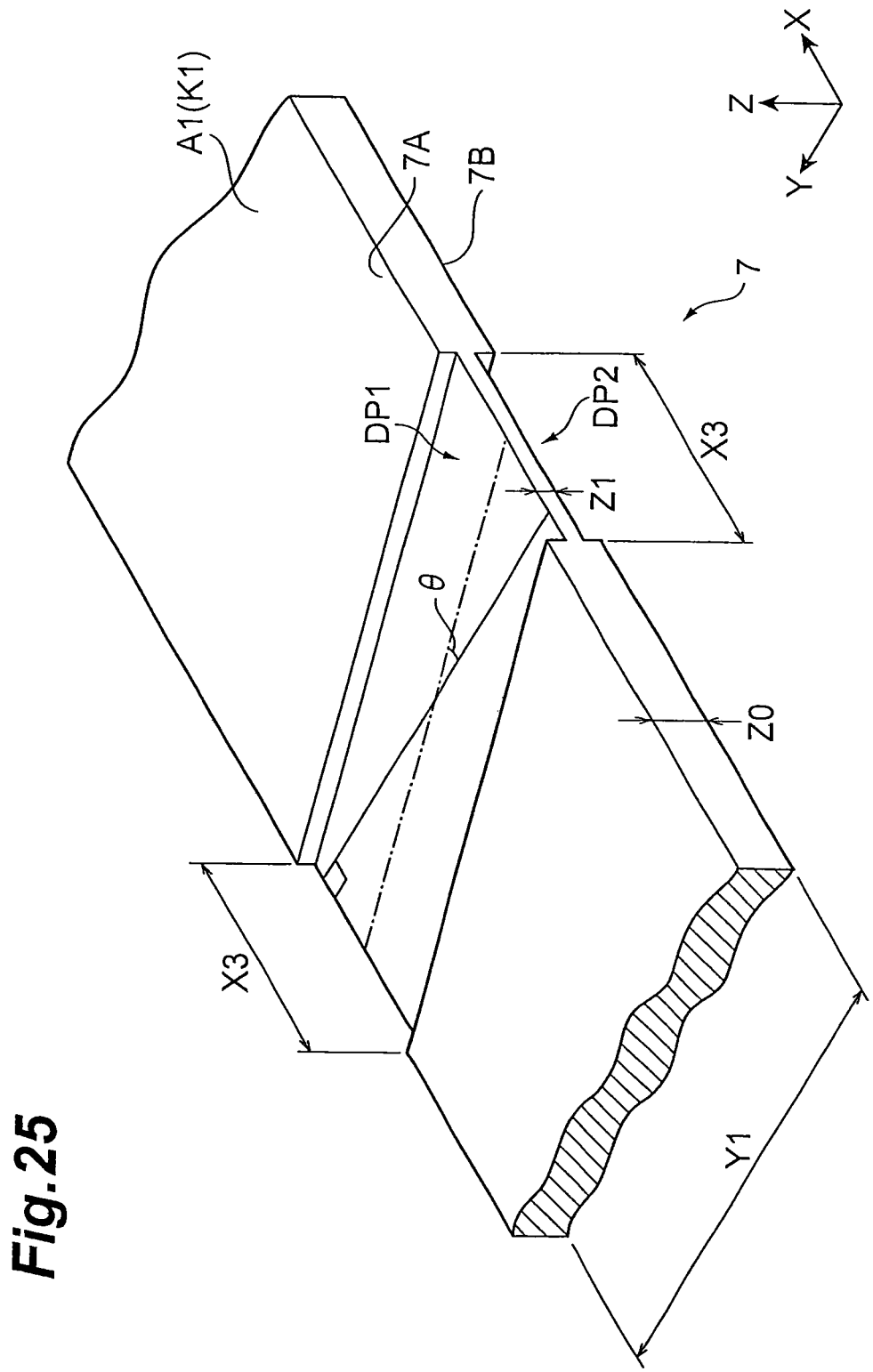
FIG. 25 is an enlarged perspective view of a processed region of a lead in accordance with the above-mentioned embodiment.

FIG. 25 is an enlarged perspective view of the processed region of the lead in accordance with this embodiment.

Letting 7A and 7B be the upper and lower faces of the processed region 7 of the lead A1 (K1), the upper and lower faces 7A, 7B constitute the front and rear faces which are main surfaces of the lead. At the seal part P1, the lead A1 (K1) has the grooves DP1, DP2 extending in a direction tilted with respect to its width direction (Y axis) on the main surfaces 7A, 7B thereof.

In the electro-chemical device of this embodiment, each lead A1 (K1) has the depressions DP1, DP2 on the front and rear faces, respectively, at the seal part P1 (see FIG. 24). The grooves DP1, DP2 may be formed on only one surface, or their extending directions may slightly shift from each other. In this example, the depressions DP1, DP2 on the front and rear faces have the same form, extend in the same direction, and are formed in areas completely overlapping each other as seen from a direction extending along the Z axis (as viewed on a plane). As a matter of course, the complete overlap allows a non-overlapping region to exist by about 3% of the total region as an error.

Assuming that a direction perpendicular to the extending direction of the grooves DP1, DP2 is the width direction of the grooves, their size in the width direction is constant along the longitudinal direction of the grooves in this example but may vary. The length of the groove in the X-axis direction is X3 at both ends in the lead width direction. Let $\theta$ be the angle formed between the longitudinal direction of the groove DP1 (DP2) and the lead width direction (Y axis). To be exact, $\theta$ is the angle formed between the longitudinal center line of the groove DP1 (DP2) and the Y axis. The value theoretically attainable by $\theta$ is greater than 0° but less than 90°. In practice, however, the degassing effect becomes low when $\theta$ is too small, while the formed region extends in the longitudinal direction of the lead when $\theta$ is too large, whereby $\theta$ is preferably at least 5° but not more than 60°, more preferably not more than 45°.

In the structure mentioned above, the resin of the resin layers R1, R1 bites into the grooves DP1, DP2, so that the lead A1 (K1) is firmly buried in the resin layers R1, R2 (see FIG. 23), while the groove extends obliquely, whereby gases existing in the groove, if any, are easier to let out of the package at the time of sealing and the like. The seal part P1 extends (along the Y axis) perpendicular to the longitudinal direction of the lead (X axis). This makes it harder for the gases to be trapped by the resin layers R1, R2 at the seal part P1, whereby the bonding force of the seal part P1 can be inhibited from being lowered by such a phenomenon.

In the above-mentioned structure, the grooves DP1, DP2 extend obliquely, so that the resin layers bite into the side faces of the grooves, the differences in level, whereby the lead A1 (K1) is restrained from moving in both the longitudinal direction (X axis) and width direction (Y axis) thereof relative to the resin layers R1, R2. Inhibiting the leads from moving can suppress disadvantages such as leakage and provide an electro-chemical device having a high quality The size X2 in the X-axis direction of the seal part P1 illustrated in FIG. 24 is set slightly longer than the size in the X-axis direction of the processed region 7 (maximum offset distance in the X-axis direction of the groove) illustrated in FIG. 25, but may be set shorter. The resin layers R1, R1 of FIG. 23 extend over the whole area of the seal part P1 in FIG. 24 and thus bite into the grooves DP1, DP2 of the processed region 7, thereby restraining the lead A1 (K1) from moving in the X- and Y-axis directions. The width. Y1 of the lead A1 (K1) is set to 3.5 mm, for example. The depth of each groove DP1 (DP2) is 10 μm. The thickness Z0 before pressing is 100 μm. The thickness Z1 of the groove forming region after processing is 80 μm.

A method for manufacturing the electro-chemical device in accordance with this embodiment comprises the steps of obliquely pressing at least a region of the lead located at the seal part P1 with respect to the lead width direction (Y axis) so as to form the grooves DP1, DP2, and arranging the lead A1 (K1) having the grooves DP1, DP2 between the resin layers R1, R2 (see FIG. 23) at the seal part P1 and thermocompression-bonding them together with the package P. This can manufacture leads inhibited from moving in the X- and Y-axis directions, whereby an electro-chemical device having a high quality can be provided. The number of grooves may also be 2 or more per surface of one lead.

Specifically, for example, an A1 foil lead having a width of 3.5 mm, a thickness of 100 μm, and a length of 30 mm is prepared, and the processed region 7 is formed by pressing which applies a pressure of $3.92 \times 10^5$ Pa to the upper and lower faces of the lead within an area smaller than the region to be thermocompression-bonded, whereby the grooves DP1, DP2 each having a depth of 10 μm are formed. The total thickness Z1 of the processed region is 80 μm, The lead is joined to a current collector of the battery element, and then a pressure of 2.94×10$^5$ Pa is applied to the seal part, so as to carry out thermocompression bonding for 7 sec at 180° C., Thermocompression-bonding the seal parts P1 to P4 completes the electro-chemical device. Before completing the thermocompression bonding of all the seal parts, the electrolytic solution is introduced into the package.

Examples of D-Type Electro-Chemical Device

Characteristics of leads in accordance with the embodiment concerning the D-type electro-chemical device were measured as Examples 1 to 9. Each initial lead material was an aluminum, piece having a width of 3.5 mm, a thickness of 100 μm, and a length of 30 mm, while the pressure and resin material were as exemplified above. The battery element was constituted by an aluminum laminate foil, activated carbon electrodes/aluminum current collector foils, a cellulose separator, and an organic electrolytic solution. The electrolytic solution was a TEMA.BF$_4$ (triethylmethylammonium tetrafluoroborate)/AN (acetonitrile) solution. The ratio of change in the liquid amount was measured between before and after a reliability test under the condition of energization at 2.5 V for 1000 hr at 70° C. Comparative Example 1 was one lacking the processed region in the embodiment of the D-type electro-chemical device, while Comparative Example 2 was one in which both widthwise ends of each lead were provided with respective semicircular cutouts each having a radius of 0.15 mm in place of the processed region having the grooves.

The resistance of the lead was measured by using the four-terminal method at room temperature (25° C.). As the breaking strength of the lead, that of the lead by itself was measured within a tester (tensile/compression tester EZ Test manufactured by Shimadzu Corporation) at room temperature (25° C.). The tensile (pull) strength was measured by the same tester at room temperature (25° C.) with a thermocompression bonding width of 5.0 mm. The final product yield was determined such that products which were chargeable and dischargeable without leakage and short-circuiting after the electrolytic solution injection were taken as good items.

Letting the evaluation point of Comparative Example 1 in each measurement be 10, respective evaluation points of Comparative Example 2 and Examples 1 to 9 were calculated relative thereto. They were scored as performance indexes. The following lists the results.

TABLE 8

|  | Resistance | Breaking strength | Tensile strength | Final product yield | Weight change ratio (leakage) | Total |
|---|---|---|---|---|---|---|
| Example 1 | 7.85 | 7.82 | 13.45 | 10.49 | 14.85 | 54.46 |
| Example 2 | 7.87 | 8.25 | 13.39 | 10.85 | 15.15 | 55.52 |
| Example 3 | 7.93 | 8.53 | 13.52 | 11.34 | 15.28 | 56.59 |
| Example 4 | 7.96 | 8.95 | 13.03 | 11.46 | 15.31 | 56.71 |
| Example 5 | 7.98 | 8.98 | 12.97 | 11.22 | 15.29 | 56.45 |
| Example 6 | 7.98 | 8.81 | 11.88 | 10.73 | 15.26 | 54.66 |
| Example 7 | 8.01 | 8.56 | 11.21 | 10.61 | 15.18 | 53.58 |
| Example 8 | 8.01 | 8.39 | 10.18 | 10.37 | 15.15 | 52.10 |
| Example 9 | 8.01 | 8.32 | 10.12 | 10.37 | 15.14 | 51.95 |
| Comparative Example 1 | 10.00 | 10.00 | 10.00 | 10.00 | 10.00 | 50.00 |
| Comparative Example 2 | 9.14 | 9.26 | 11.21 | 10.61 | 11.23 | 51.46 |

As mentioned above, the electro-chemical devices in accordance with the examples slightly increased their resistance as their cross-sectional area decreased, but remarkably improved their reliability by enhancing their pull strength. From this viewpoint, it has been found that the electro-chemical device in accordance with the embodiment is much better than those of Comparative Examples 1 and 2 in terms of experiments as well. The total score exceeds 55 in Examples 2 to 5, i.e., when the angle θ is 5° to 45°, which is further preferred.

What is claimed is:
1. An electro-chemical device comprising:
a package including a metal film;
a battery element sealed within the package;

TABLE 7

|  | Processed size θ(°) X3(mm) | Resistance (mΩ) | Breaking strength (N) | Tensile strength (N) | Final product yield (%) | Liquid amount change after reliability test(%) |
|---|---|---|---|---|---|---|
| Example 1 | θ = 3<br>X3 = 2.0 | 2.90 | 22.3 | 22.2 | 86 | −3.5 |
| Example 2 | θ = 5<br>X3 = 2.0 | 2.89 | 23.5 | 22.1 | 89 | −1.5 |
| Example 3 | θ = 15<br>X3 = 2.0 | 2.87 | 24.3 | 22.3 | 93 | −0.7 |
| Example 4 | θ = 30<br>X3 = 2.0 | 2.86 | 25.5 | 21.5 | 94 | −0.5 |
| Example 5 | θ = 45<br>X3 = 2.0 | 2.85 | 25.6 | 21.4 | 92 | −0.6 |
| Example 6 | θ = 48<br>X3 = 2.0 | 2.85 | 25.1 | 19.6 | 88 | −0.8 |
| Example 7 | θ = 60<br>X3 = 2.0 | 2.84 | 24.4 | 18.5 | 87 | −1.3 |
| Example 8 | θ = 65<br>X3 = 2.0 | 2.84 | 23.9 | 16.8 | 85 | −1.5 |
| Example 9 | θ = 75<br>X3 = 2.0 | 2.84 | 23.7 | 16.7 | 85 | −1.6 |
| Comparative Example 1 | — | 2.28 | 28.5 | 16.5 | 82 | −35.0 |
| Comparative Example 2 | semicircular with radius of 0.15 mm | 2.49 | 26.4 | 18.5 | 87 | −27.0 | resin layers disposed at least on the inside of a seal part of the package; and a lead extending in a length direction from the battery element to the outside of the package through between, in a thickness direction perpendicular to the length direction, the resin layers at the seal part of the package, wherein the lead has a thickness $Z1$ in the thickness direction and an upper surface and a lower surface in the thickness direction, and the resin layers have a total thickness $Z2$ in the thickness direction;

the lower surface of the lead defines a curve in a cross-section containing the thickness direction and a width direction perpendicular to both the length direction and the thickness direction, the curve including a portion that unidirectionally curves toward the upper surface, the portion having two end points that define therebetween a straight line having a length $L1$, the portion having a top point between the two end points, the top point having a maximum distance $L2$ from the straight line; and the lead satisfies the relationship of;

$$30\% \leq Z1/Z2 \leq 60\%, \text{ and}$$

$$0 < R < 2\%$$

where $R = L2/L1$.

2. An electro-chemical device according to claim 1, wherein the thickness $Z1$ of the lead satisfies the relationship of:

$$30 \text{ μm} \leq Z1 \leq 200 \text{ μm}.$$

3. An electro-chemical device according to claim 1, wherein an area S enclosed by the portion and the straight line satisfies the relationship of $0 < S \leq 0.02 \text{ mm}^2$.

* * * * *